(12) United States Patent
Mogamiya

(10) Patent No.: US 7,475,484 B2
(45) Date of Patent: Jan. 13, 2009

(54) LOCK MECHANISM FOR STAGE APPARATUS

(75) Inventor: Makoto Mogamiya, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/610,627

(22) Filed: Dec. 14, 2006

(65) Prior Publication Data

US 2007/0141920 A1 Jun. 21, 2007

(30) Foreign Application Priority Data

Dec. 15, 2005 (JP) ............................ P2005-362491
Dec. 15, 2005 (JP) ............................ P2005-362495

(51) Int. Cl.
*B23Q 3/00* (2006.01)

(52) U.S. Cl. .......................................... 33/1 M; 396/55

(58) Field of Classification Search ................... 33/1 M; 396/55

See application file for complete search history.

(56) References Cited

U.S. PATENT DOCUMENTS

| 3,738,764 | A | * | 6/1973 | Gribble | ........................ | 33/1 M |
| 3,744,891 | A | * | 7/1973 | Dennis et al. | ................. | 33/1 M |
| 4,805,316 | A | * | 2/1989 | Curti | ......................... | 33/613 |
| 5,153,633 | A | * | 10/1992 | Otani | ........................... | 396/55 |
| 5,398,132 | A | * | 3/1995 | Otani | ........................... | 396/55 |
| 5,842,052 | A | * | 11/1998 | Okano | .......................... | 396/55 |
| 6,035,133 | A | * | 3/2000 | Shiomi | ........................ | 396/55 |
| 2005/0157287 | A1 | | 7/2005 | Seo | | |
| 2005/0185057 | A1 | | 8/2005 | Seo | | |
| 2005/0204640 | A1 | | 9/2005 | Seo | | |
| 2006/0007320 | A1 | | 1/2006 | Seo | | |
| 2006/0017818 | A1 | | 1/2006 | Enomoto | | |
| 2006/0064884 | A1 | | 3/2006 | Seo | | |
| 2006/0070302 | A1 | | 4/2006 | Seo | | |
| 2006/0146400 | A1 | | 7/2006 | Seo | | |
| 2006/0284495 | A1 | | 12/2006 | Seo et al. | | |
| 2007/0014555 | A1 | | 1/2007 | Hirunuma et al. | | |

FOREIGN PATENT DOCUMENTS

JP 3431020 5/2003

OTHER PUBLICATIONS

U.S. Appl. No. 11/539,186 to Hirunuma et al., filed Oct. 6, 2006.
U.S. Appl. No. 11/539,193 to Hirunuma et al., filed Oct. 6, 2006.
U.S. Appl. No. 11/539,188 to Hirunuma et al., filed Oct. 6, 2006.

* cited by examiner

*Primary Examiner*—Christopher W Fulton
(74) *Attorney, Agent, or Firm*—Greenblum & Bernstein, P.L.C.

(57) ABSTRACT

A lock mechanism for a stage apparatus, the stage apparatus having a stationary support board and a movable stage, includes a lock member positioned immediately in front or behind the movable stage; lock holes formed in opposed portions of one of the lock member and the movable stage; lock pins formed on the opposed portions of the other of the lock member and the movable stage, wherein ends of the lock pins which are smaller in diameter are engageable and disengageable from the lock holes; and a driving device which moves the lock member toward the movable stage to engage the lock pins with the lock holes upon the movable stage entering a non-operational state, and moves the lock member away from the movable stage to disengage the lock pins from the lock holes upon the movable stage entering an operational state.

18 Claims, 16 Drawing Sheets

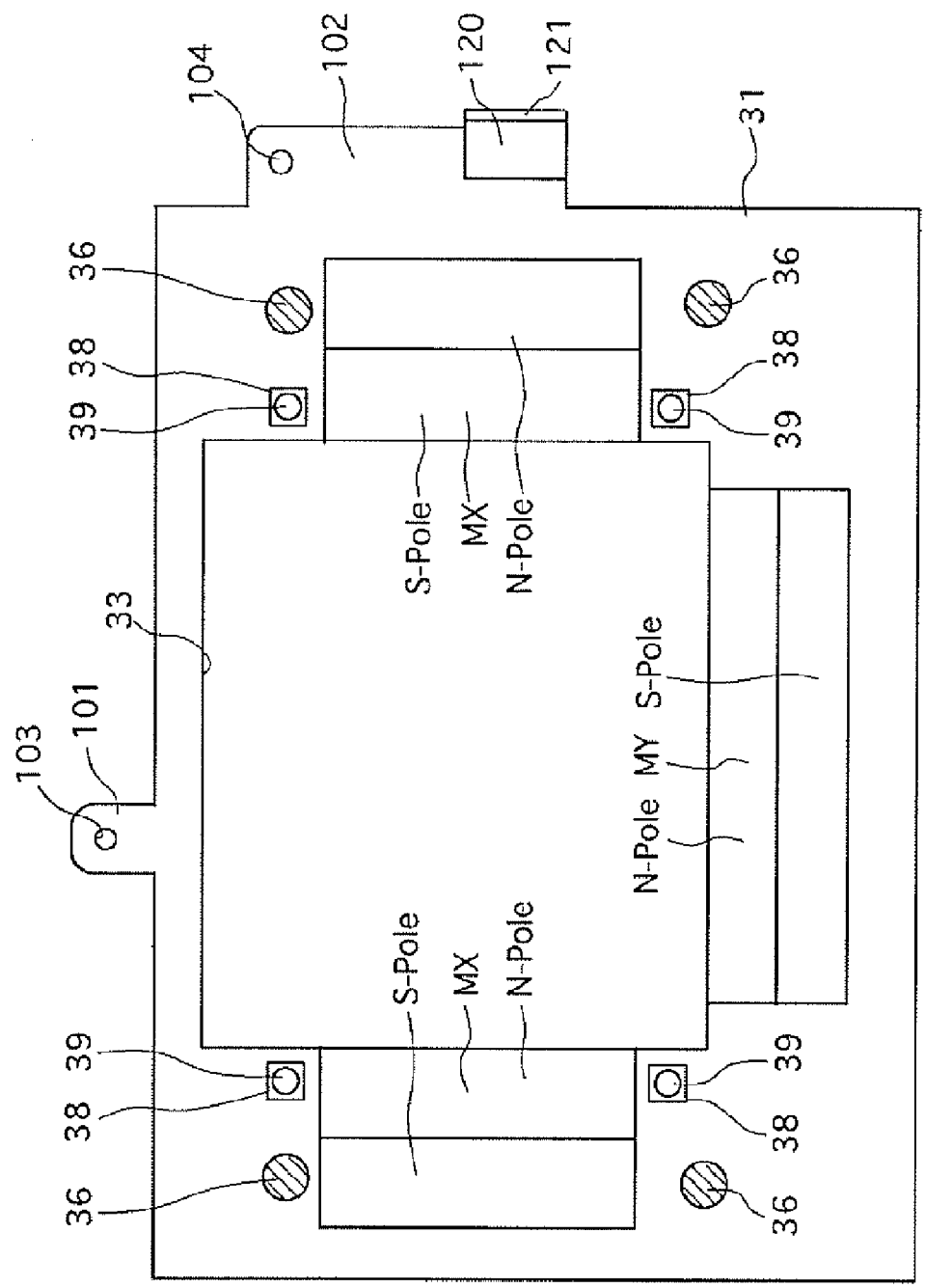

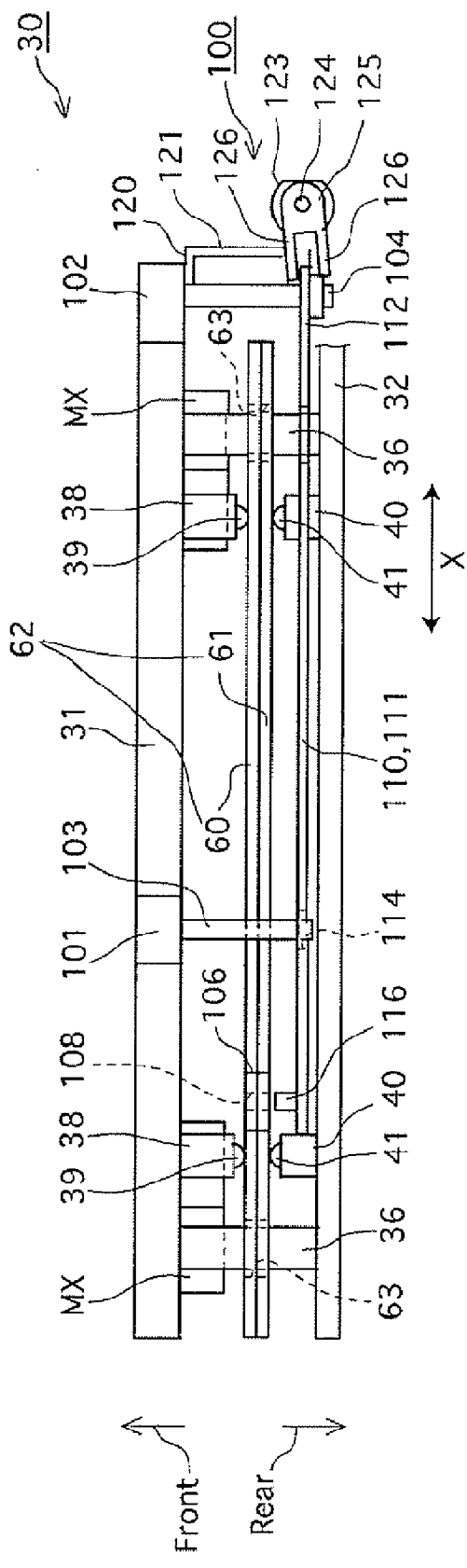
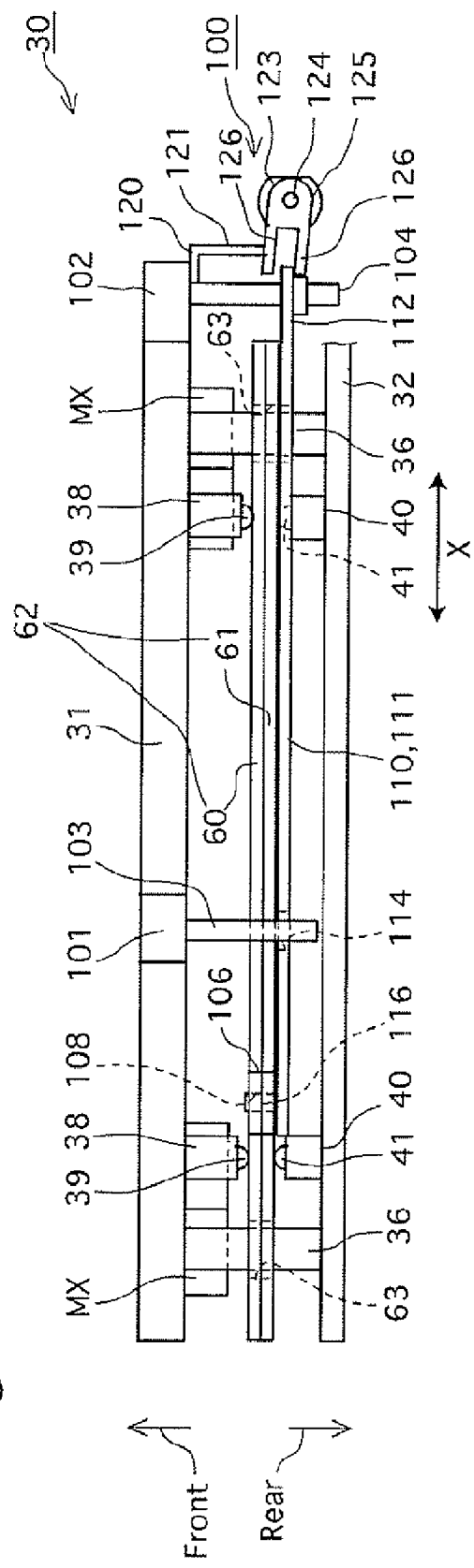

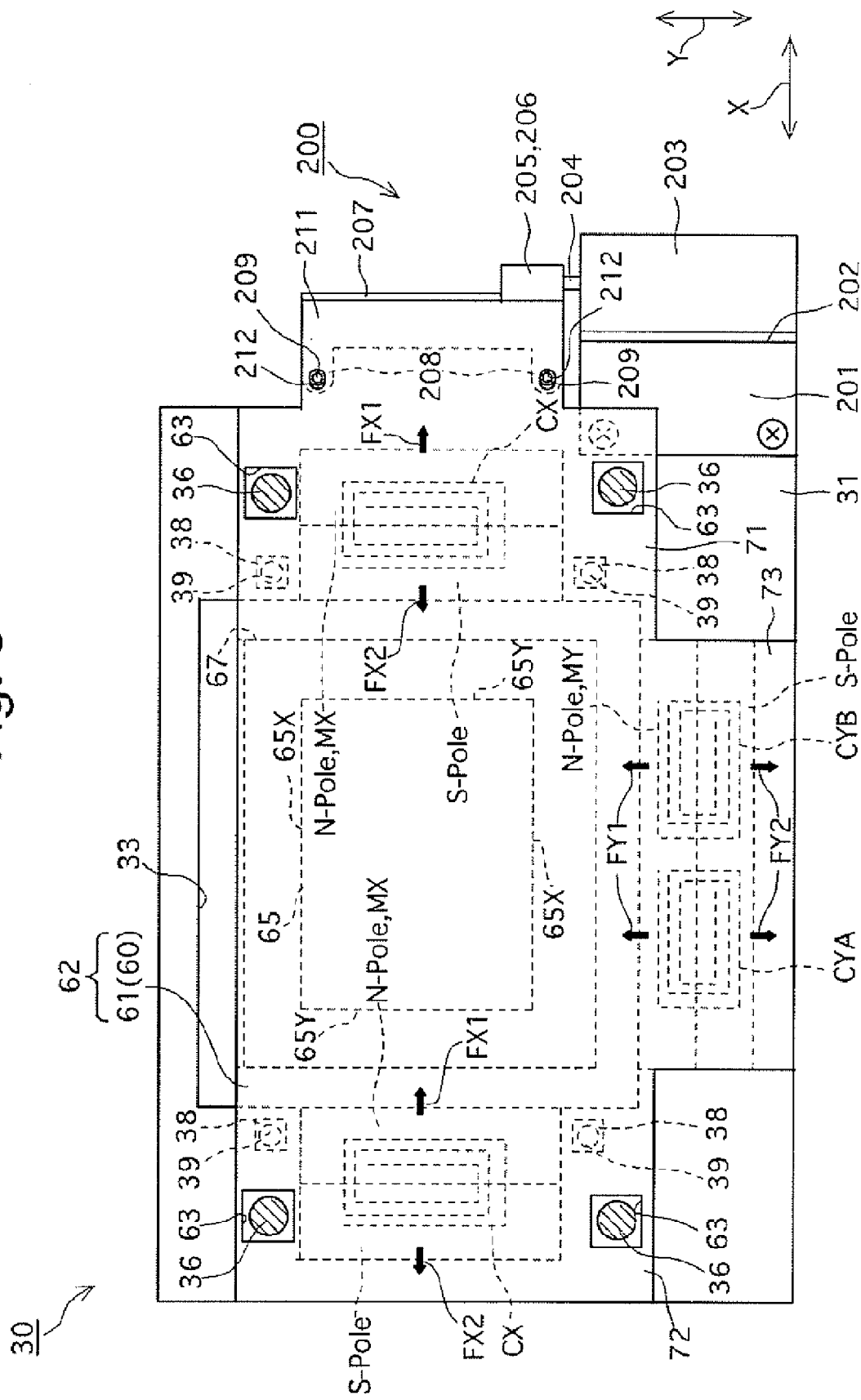

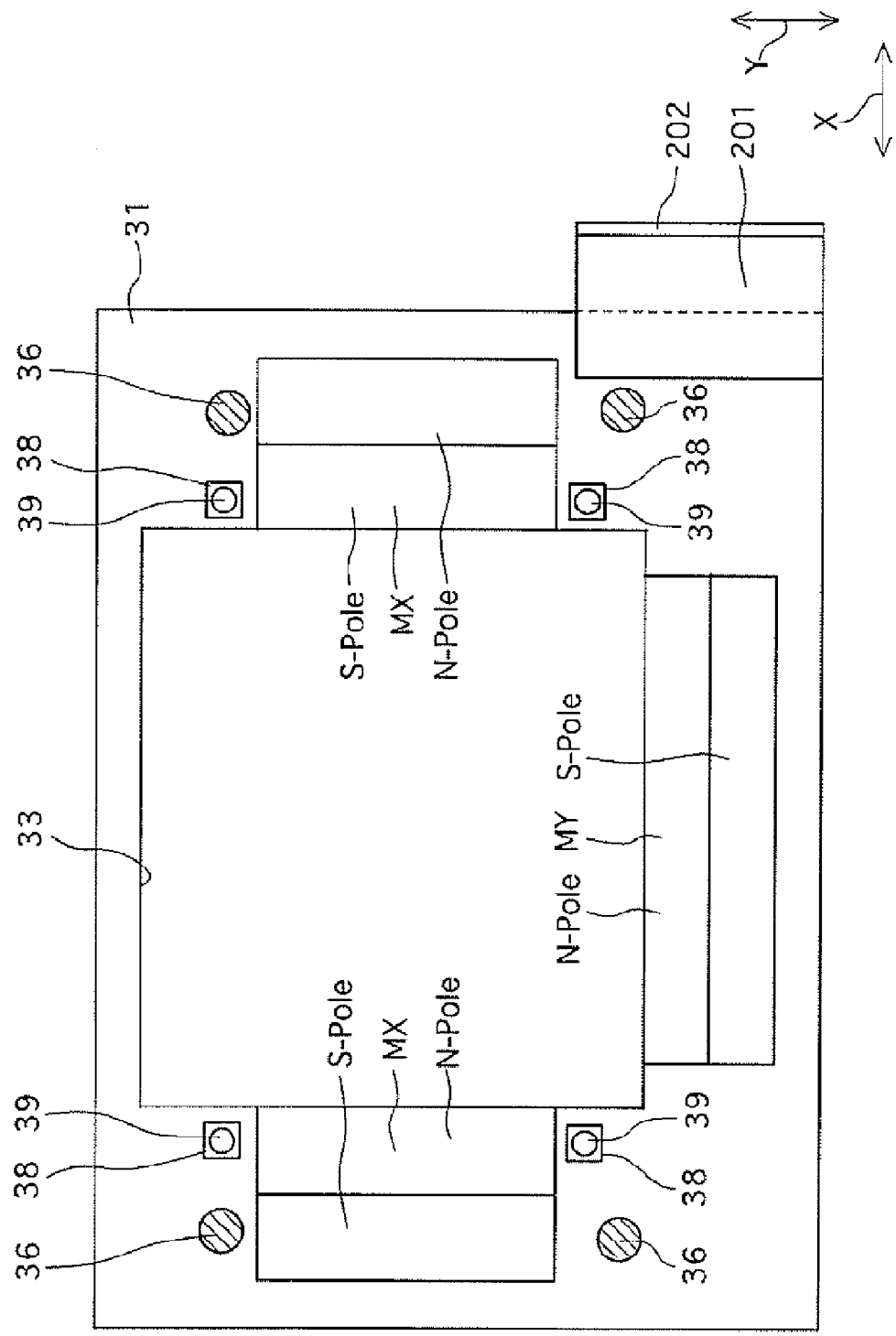

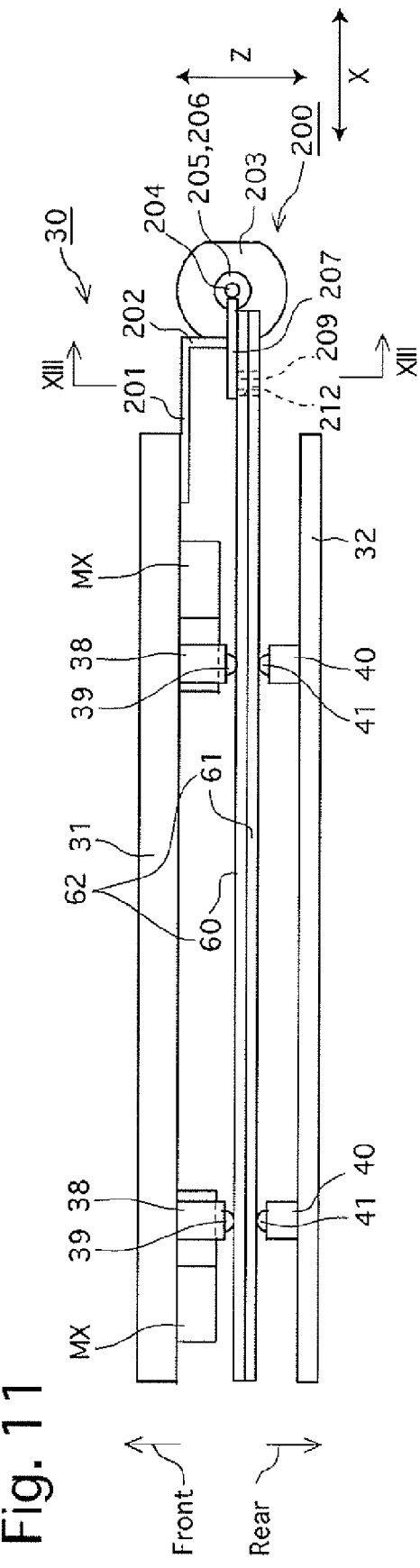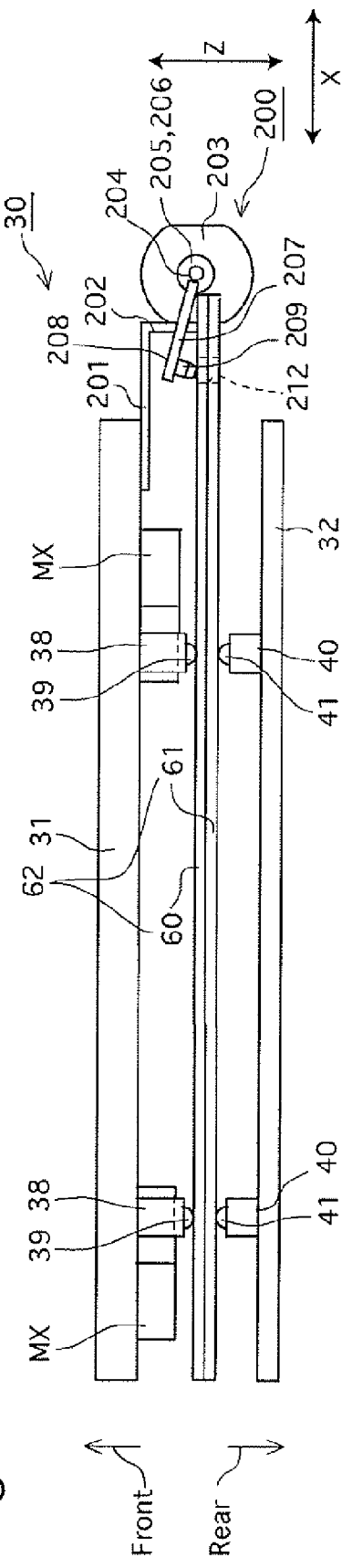

Fig. 17
Fig. 18
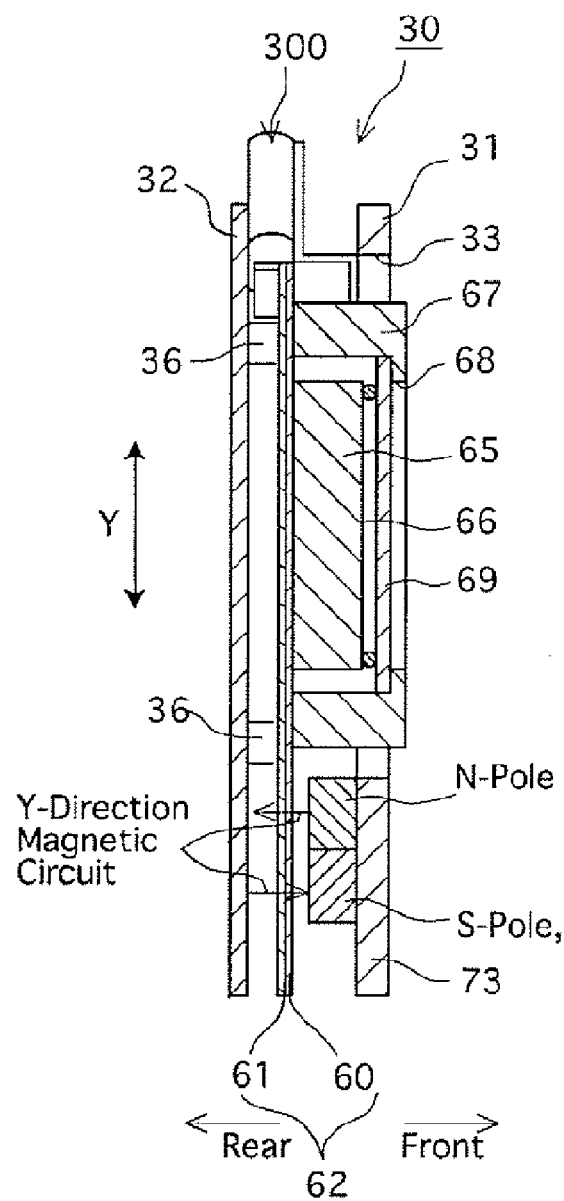
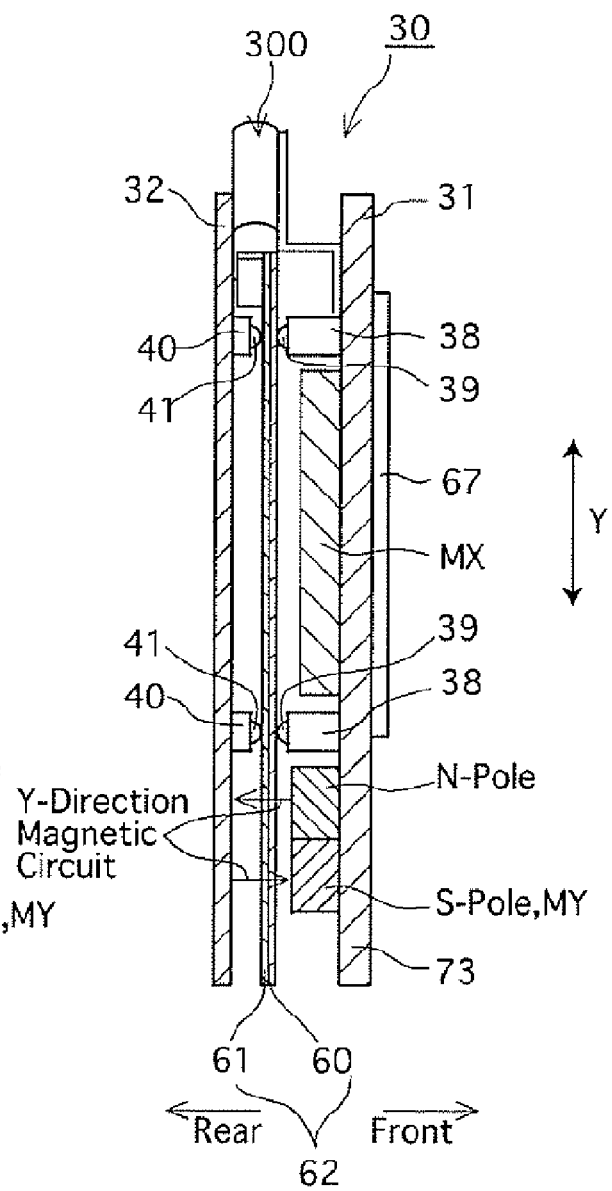

LOCK MECHANISM FOR STAGE APPARATUS

BACKGROUND OF THE INVENTION

1. Field of the Invention

The present invention relates to a lock mechanism for a stage apparatus which locks a movable stage when the movable stage, which is freely movable along a specific plane, is in a non-operational state.

2. Description of the Prior Art

A first example of the aforementioned conventional lock mechanism for a movable stage is disclosed in a third embodiment of Japanese Patent No. 3431020.

In this lock mechanism, an image pickup device is mounted to a front surface of the movable stage which is an element of the stage apparatus, and the movable stage is provided on the back surface thereof with an engaging recess (lock hole). An engaging member (lock pin) which is freely movable forward and reverse in directions parallel to an optical axis is installed behind the stage apparatus (the movable stage), and the movable stage which is in a non-operational state in which no hand-shake correction is performed is locked by engaging the engaging member with the engaging recess.

A second example of the aforementioned conventional lock mechanism for a movable stage is disclosed in a first embodiment of Japanese Patent No. 3431020.

This lock mechanism is provided with one cylindrical boss which projects from the back surface of the movable stage, and first and second abutting members positioned behind the movable stage on mutually opposing sides of the cylindrical boss. The first and second abutting members are linearly movable in a direction parallel to the movable stage.

Upon the movable stage entering a non-operational state in which no hand-shake correction is performed, the first abutting member and the second abutting member move to their respective locked positions where the first abutting member and the second abutting member are positioned closely to each other. Thereupon, approximately half-circle shaped engaging recesses that are respectively formed on opposing surfaces of the first and second abutting members clasp the cylindrical boss. Consequently, the movable stage is locked by the first and second abutting members.

In the aforementioned first example of the conventional lock mechanism, the engaging member (lock pin) is greater in diameter than the engaging recess (lock hole), and the end of the engaging member is conical in shape. When the movable stage is locked, the conical end of the engaging member is engaged in the engaging recess.

However, since the end of the engaging member is conical in shape, there is a possibility of the engaging member moving in a direction to be disengaged from the engaging recess to thereby release the lock unexpectedly if the movable stage slides by a strong force.

Additionally, another problem arises if the lock mechanism disclosed in Japanese Patent No. 3431020 is applied to a hand-shake correction apparatus (image-shake correction apparatus/image-shake reduction apparatus) capable of correcting rotational shake. In this particular type of hand-shake correction apparatus, the movable stage is rotatable for correction of rotational shake. However, even if the engaging member is engaged in the engaging recess, the movable stage cannot be locked to be prevented from rotating because the lock mechanism is provided with only one engaging recess and corresponding one engaging member.

If a lock mechanism like the above described lock mechanism is installed behind the stage apparatus in a manner similar to that in the aforementioned second example of the conventional lock mechanism, the size of the stage apparatus in the optical axis direction increases, which consequently increases the thickness of the stage apparatus in an optical axis direction of a camera in which the stage apparatus is incorporated.

Additionally, providing the movable stage with the aforementioned boss (pin) makes it more difficult to control movements of the movable stage due to the additional weight of the boss, thus making it impossible to perform the hand-shake correction operation with precision.

Furthermore, since the aforementioned second example of the conventional lock mechanism also has only one boss (pin), the movable stage cannot be locked to be prevented from rotating even if the boss is clasped by the first and second abutting members therebetween.

SUMMARY OF THE INVENTION

The present invention provides a lock mechanism for a stage apparatus which can securely lock the movable stage while having a simple structure, and which can further prevent the movable stage from rotating.

The present invention further provides a lock mechanism for a stage apparatus, wherein the dimension of the movable stage in an optical axis direction does not need to be increased, wherein no influence is exerted on the hand-shake correction operation, and wherein the movable stage can be prevented from rotating.

According to an aspect of the present invention, a lock mechanism for a stage apparatus is provided, the stage apparatus having at least one stationary support board and a movable stage, wherein the movable stage is movable relative to the stationary support board in a plane parallel to the stationary support board, the lock mechanism including a lock member positioned immediately one of in front of and behind the movable stage, the lock member being movable toward and away from the movable stage by moving in a direction substantially orthogonal to a direction of movement of the movable stage; a plurality of lock holes formed in opposed portions of one of the lock member and the movable stage; a plurality of lock pins formed on the opposed portions of the other of the lock member and the movable stage, wherein ends of the plurality of lock pins which are smaller in diameter than other portions thereof are capable of being engaged in and disengaged from the plurality of lock holes, respectively; and a driving device which moves the lock member toward the movable stage to engage the plurality of lock pins with the plurality of lock holes, respectively, upon the movable stage entering a non-operational state, and moves the lock member away from the movable stage to disengage the plurality of lock pins from the plurality of lock holes, respectively, upon the movable stage entering an operational state.

It is desirable for the driving device to be fixedly provided beside the movable stage at a periphery thereof.

It is desirable for the plurality of lock holes to be made in the movable stage, and for the plurality of lock pins to be formed on the lock member.

It is desirable for the movable stage to include an X-direction edge parallel to an X-direction and a Y-direction edge parallel to a Y-direction orthogonal to the X-direction, and for the lock member to be substantially L-shaped as viewed from the front thereof so as to have an X-direction elongated portion parallel to the X-direction edge and a Y-direction elongated portion parallel to the Y-direction edge.

It is desirable for a guide hole to be formed in one of the lock member and the stationary support board, and for the other of the lock member and the stationary support board to include a guide pin which extends in a direction orthogonal to the movable stage to be engaged in the guide hole to guide the lock member in a direction toward and away from the movable stage.

It is desirable for the driving device to include a motor having a rotary shaft, an axis of which is parallel to the Y-direction, wherein the lock mechanism further includes an engaging member which is fixed to the rotary shaft and holds the lock member at opposite sides thereof, and rotational motion of the rotary shaft is converted to linear motion to be transferred to the lock member via the engaging member so that the lock member moves in the direction toward and away from the movable stage when the rotary shaft rotates.

It is desirable for the driving device to be a motor having a rotary shaft, an axis of which is parallel to the movable stage, and for the lock member to include a rotating plate fixed to the rotary shaft.

It is desirable for the movable stage to include an X-direction edge parallel to an X-direction and Y-direction edge parallel to a Y-direction orthogonal to the X-direction, and for the rotary shaft of the motor to be parallel to the Y-direction.

It is desirable for base portions of the plurality of lock pins to be in the shape of truncated cones, diameters of which increase in a direction away from the ends of the plurality of lock pins, respectively. Maximum diameters of the base portions are greater than diameters of the plurality of lock holes, respectively.

It is desirable for the stage apparatus to include two parallel stationary support boards between which the movable stage is positioned.

It is desirable for the lock mechanism to be configured for a camera-shake correction apparatus incorporated in a digital camera.

In an embodiment, a lock mechanism for a stage apparatus is provided, the stage apparatus having at least one stationary support board and a movable stage, wherein the movable stage is movable relative to the stationary support board in a plane parallel to the stationary support board, the lock mechanism including at least one lock hole made in one of the stationary support board and the movable stage; at least one lock pin formed on the other of the stationary support board and the movable stage to be loosely engaged in the lock hole to be allowed to move relative to the lock hole; and a driving device positioned beside the movable stage on a periphery thereof and lying in a plane in which the movable stage lies. The driving device moves away from the movable stage upon the movable stage entering an operational state, and wherein the driving device presses the movable stage in a direction of movement thereof to make the lock pin pressure contact an inner edge in the lock hole upon the movable stage entering a non-operational state.

It is desirable for the lock mechanism to includes a plurality of the lock holes, and a corresponding plurality of the lock pins.

It is desirable for the lock hole and the lock pin to constitute a moving range limiting device which limits the range of movement of the movable stage.

It is desirable for the driving device to include a motor having an output shaft, an axis of which is parallel to the movable stage, the output shaft being movable toward and away from the movable stage in a direction of the axis of the output shaft.

It is desirable for the stage apparatus to include two stationary support boards positioned on opposite sides of the movable stage, wherein the lock pin includes a column which connects the two stationary support boards, and the lock hole is formed in the movable stage.

It is desirable for the lock hole to be rectangular in shape.

In an embodiment, a lock mechanism for a stage apparatus is provided, the stage apparatus having at least one stationary support board and a movable stage, wherein the movable stage is movable relative to the stationary support board in a plane parallel to the stationary support board, the lock mechanism including a plurality of lock holes made in one of the stationary support board and the movable stage; a plurality of lock pins formed on the other of the stationary support board and the movable stage to be engageable in the lock holes, respectively, to be allowed to move relative to the lock holes; and a driving device provided at a periphery of the movable stage and positioned in a plane in which the movable stage lies and moves. The driving device moves the lock pins so as to contact the lock holes, respectively, upon the movable stage entering a non-operational state, and moves the lock pins so as to not to contact the lock holes, respectively, upon the movable stage entering an operational state.

Since the movable stage is locked by the engagement of the plurality of lock pins in the plurality of lock holes, respectively, the movable stage can be reliably locked; moreover, the movable stage which is configured to be rotatable can be locked to be prevented from rotating.

Furthermore, since the ends of the lock pins that are smaller in diameter than the lock holes are engaged in the lock holes when the movable stage is locked, the engagement of the lock pins with the lock holes is not released even if the movable stage is forced to slidingly move.

According to the present invention, since the driving device is positioned beside the movable stage on the periphery thereof and lies in a plane in which the movable stage lies, the thickness of the movable apparatus does not increase even if the lock mechanism according to the present invention is adopted.

Additionally, since no pins (lock pins) are projected from the movable stage, the weight of the movable stage does not increase by the weight of such pins, which does not make movements of the movable stage difficult to control. Consequently, the hand-shake correction operation can be performed with a high degree of precision.

Furthermore, the movable stage which is configured to be capable of rotating can be prevented from rotating if the number of the lock holes and the number of the lock pins are more than one.

The present disclosure relates to subject matter contained in Japanese Patent Applications Nos. 2005-362491 and 2005-362495 (both filed on Dec. 15, 2005), which are expressly incorporated herein in their entireties.

BRIEF DESCRIPTION OF THE DRAWINGS

The present invention will be discussed below in detail with reference to the accompanying drawings, in which:

FIG. 3 is a rear elevational view of a stationary support board and fixing members thereof;

FIG. 4 is a plan view of the camera-shake correction apparatus when a lock mechanism therefor is in an unlocked state;

FIG. 5 is a plan view of the camera-shake correction apparatus when the lock mechanism is in a locked state;

FIG. 9 is a rear elevational view of a second embodiment of the camera-shake correction apparatus with a rear stationary support board thereof omitted for clarity;

FIG. 10 is a rear elevational view of a front stationary support board and fixing members thereof in the second embodiment of the camera-shake correction apparatus;

FIG. 11 is a plan view of the camera-shake correction apparatus when a lock mechanism therefor is in an locked state;

FIG. 12 is a plan view of the camera-shake correction apparatus when the lock mechanism is in a unlocked state;

FIG. 17 is a cross sectional view taken along XVII-XVII line shown in FIG. 14;

FIG. 18 is a cross sectional view taken along XVIII-XVIII line shown in FIG. 14;

DESCRIPTION OF THE PREFERRED EMBODIMENTS

A first embodiment of a camera-shake correction apparatus according to the present invention will be hereinafter discussed with reference to FIGS. 1 through 8. In the following description, as shown by the double-headed arrows in FIGS. 1 and 2, the leftward/rightward direction, the upward/downward direction, and the forward/rearward direction of a camera-shake correction apparatus 30 incorporated in a digital camera 20 is defined as the X-direction, the Y-direction and the Z-direction, respectively The forward/rearward direction of the camera-shake correction apparatus 3C corresponds to the direction of an optical axis O of a photographic optical system.

Firstly the camera-shake correction apparatus (hand-shake correction apparatus/stage apparatus) 30, which has a lock mechanism 100 therein according to the present invention, will be described hereinafter.

Figure 1:
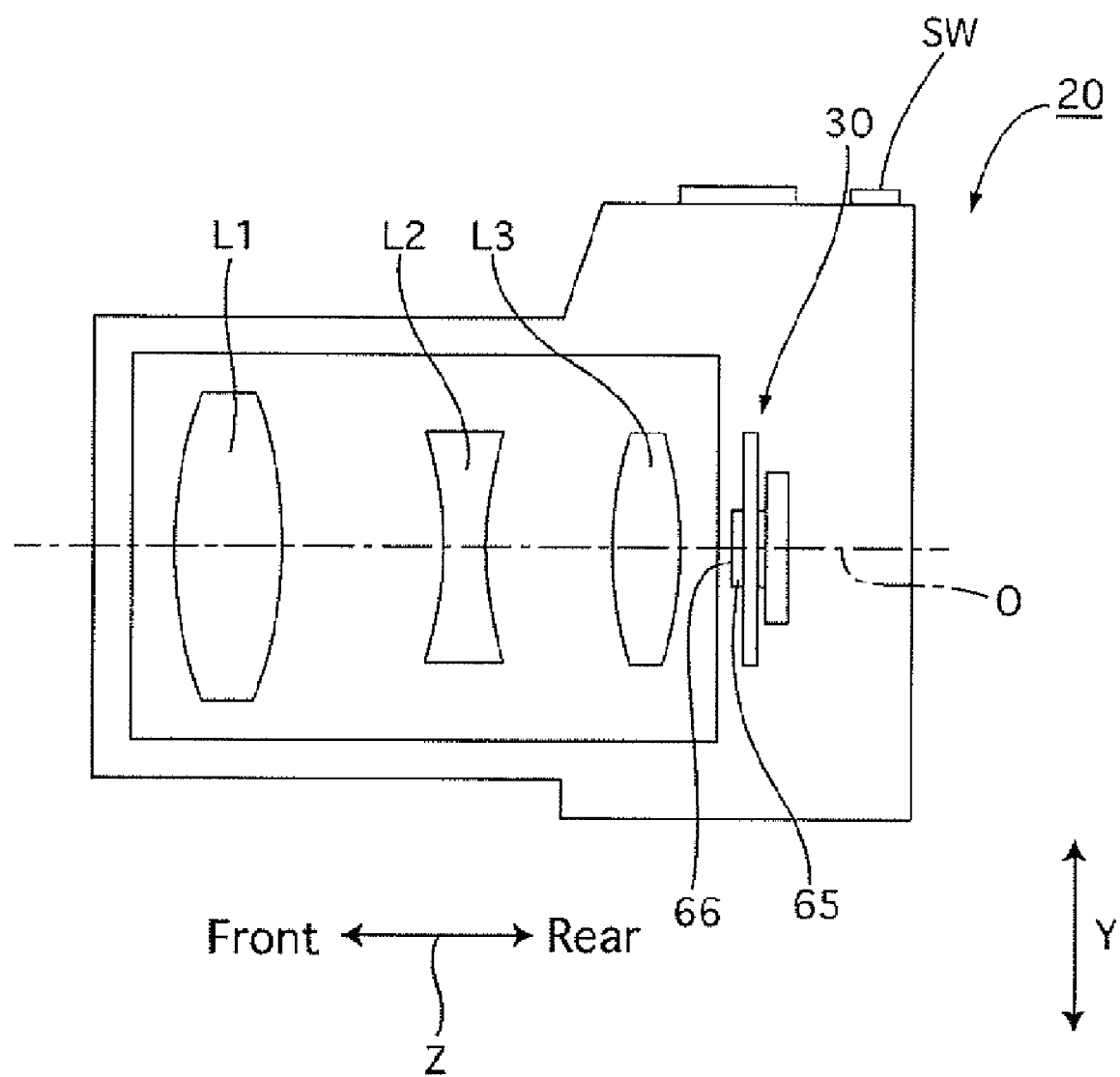
FIG. 1 is a longitudinal sectional view of a digital camera which incorporates a first embodiment of a camera-shake correction apparatus according to the present invention.

As shown in FIG. 1, the digital camera 20 is provided therein with the aforementioned optical system having first, second and third lens groups L1, L2 and L3, and the camera-shake correction apparatus 30 is provided behind the third lens group L3.

The camera-shake correction apparatus 30 has a construction shown in FIGS. 2 through 6.

As shown in FIGS. 2 through 6, the camera-shake correction apparatus 30 is provided with a front stationary support board 31, which has a horizontal rectangular shape (as viewed from the front thereof) and is made from a magnetic material such as a soft iron, and a rear stationary support board (stationary support board) 32 having the same size and shape as the front stationary support board 31 and is also made from a magnetic material such as a soft iron. The front stationary support board 31 and the rear stationary support board 32 are connected to each other by connecting four portions of the front stationary support board 31 with corresponding four portions of the rear stationary support board 32 by four support cylindrical columns 36, respectively, which extend in the Z-direction. The front stationary support board 31 and the rear stationary support board 32 that are thus connected to each other are parallel to each other. The front stationary support board 31 is provided in a central portion thereof with a rectangular mounting hole (through-hole) 33. The front stationary support board 31 is secured to an inner surface of a camera body of the digital camera 20 by three set screws (not shown).

The front stationary support board 31 is provided, on the rear surface thereof at four positions thereon, with four rectangular-prism support projections 38, respectively, which are formed to project rearward. Each of the four rectangular-prism support projections 38 is provided on a rear end surface thereof with a hemispherical recess (not shown) in which a front half portion of a metal ball 39 is rotatably fitted to be supported by the hemispherical recess. The rear stationary support board 32 is provided, on the front surface thereof at four positions facing the four rectangular-prism support projections 38, with four support projections 40 which are formed to project forward to be aligned with the four rectangular-prism support projections 38, respectively. Each of the four support projections 40 is provided on a front end surface thereof with a hemispherical recess (not shown) in which a rear half portion of a metal ball 41 is rotatably fitted to be supported by the hemispherical recess.

The camera-shake correction apparatus 30 is provided, on the rear surface of the front stationary support board 31 in the vicinity of the opposite ends thereof in the leftward/rightward direction, with two X-direction magnets MX which are secured to the rear surface of the front stationary support board 31 so that an S-pole and an N-pole of each X-direction magnet MX are aligned in the X-direction. The two X-direction magnets MX are aligned in the X-axis direction and the positions of the two X-direction magnets MX in the Y-axis direction are the same. Two X-direction magnetic circuits are formed between the two X-direction magnets MX and two portions of the rear stationary support board 32 which face the two X-direction magnets MX in the forward/rearward direction, respectively, due to the magnetic flux of the two X-direction magnets MX passing through the front stationary support board 31 and the rear stationary support board 32. Namely, the front stationary support board 31 and the rear stationary support board 32 function as yokes.

On the other hand, the camera-shake correction apparatus 30 is provided, on the rear surface of the front stationary support board 31 at a lower end thereof, with two Y-direction magnets (left and right Y-direction magnets) MY which are secured to the rear surface of the front stationary support board 31 so that an S-pole and an N-pole of each Y-direction magnet MY are aligned in the Y-direction. Two Y-axis-direction magnetic circuits are formed between the two Y-direction magnets MY and two portions of the rear stationary support board 32 which face the two Y-direction magnets MY in the forward/rearward direction, respectively, due to the magnetic flux of the two Y-direction magnets MY passing through the front stationary support board 31 and the rear stationary support board 32. Namely, the front stationary support board 31 and the rear stationary support board 32 function as yokes.

Figure 2:
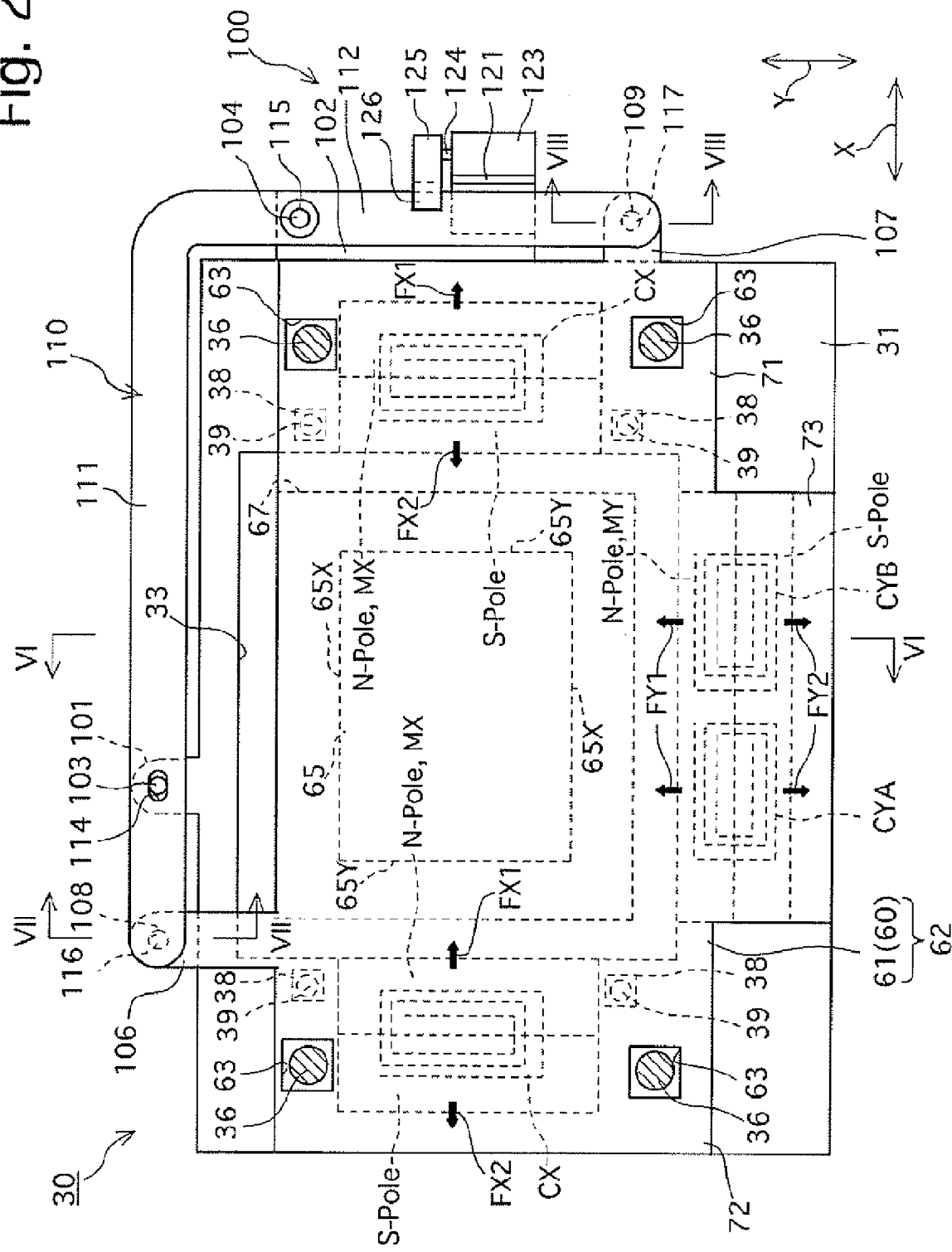
FIG. 2 is a rear elevational view of the camera-shake correction apparatus shown in FIG. 1 with a rear stationary support board thereof omitted for clarity.

The camera-shake correction apparatus 30 is provided with an electrical board 60, which is a flat rectangular board, and a reinforcing plate 61 having the same shape as the electrical board 60 as viewed from the front. The reinforcing plate 61 is fixed to the back of the electrical board 60 to be integral therewith so that the electrical board 60 and the reinforcing plate 61 constitute a movable stage 62. As shown in FIG. 2, the four metal balls 39 are in contact with the front surface of the electrical board 60 (i.e., the front surface of the movable stage 62) at four points to be freely rotatable thereat, respectively, and the four metal balls 41 are in contact with the rear surface of the reinforcing plate 61 (i.e., the rear surface on the movable stage 62) at four points to be freely rotatable thereat, respectively. In other words, the movable stage 62, which is constructed from the electrical board 60 and the reinforcing plate 61, is held between the four metal balls 39 and the four metal balls 41 in the forward/rearward position, and the movable stage 62 is provided orthogonal to the optical axis O of the photographic optical system, that has the first, second and third lens groups L1, L2 and L3 (i.e., the movable stage 62 is parallel to the front and rear stationary support boards 31 and 32).

Accordingly, from the initial position shown in FIG. 2, the movable stage 62 is linearly movable not only in the X-direction and the Y-direction relative to the front stationary support board 31 and the rear stationary support board 32 but also in an X-Y plane parallel to both the X-direction and the Y-direction (i.e., orthogonal to the optical axis O) relative to the front stationary support board 31 and the rear stationary support board 32.

Four moving range limiting holes (rectangular holes) 63 are formed in the movable stage 62 (i.e., a combination of the electrical board 60 and the reinforcing plate 61) at four position thereon. The four support cylindrical columns 36 pass through the four moving range limiting holes 63, respectively. The four support cylindrical columns 36 and the four moving range limiting holes 63 constitute a moving range limiting device which limits the range of movement of the movable stage 62 relative to the front stationary support board 31 and the rear stationary support board 32 to a predetermined range of movement. The movable stage 62 is movable relative to the front stationary support board 31 and the rear stationary support board 32 within a range of movement in which the four support cylindrical columns 36 do not come in contact with the inner edges (inner walls) in the four moving range limiting holes 63, respectively.

A CCD (image pickup device) 65 is fixed to a front surface of the electrical board 60 at the center thereof. As shown in FIG. 2, the CCD 65 is in the shape of a rectangle as viewed from the front thereof. The CCD 65 is provided with a pair of X-direction edges (upper and lower X-direction edges) 65X which extend parallel to each other in the X-direction and a pair of Y-direction edges (right and left Y-direction edges) 65Y which extend parallel to each other in the Y-direction, in the state shown in FIG. 2 in which the electrical board 60 (the movable stage 62) is in the initial position thereof.

Figure 6:
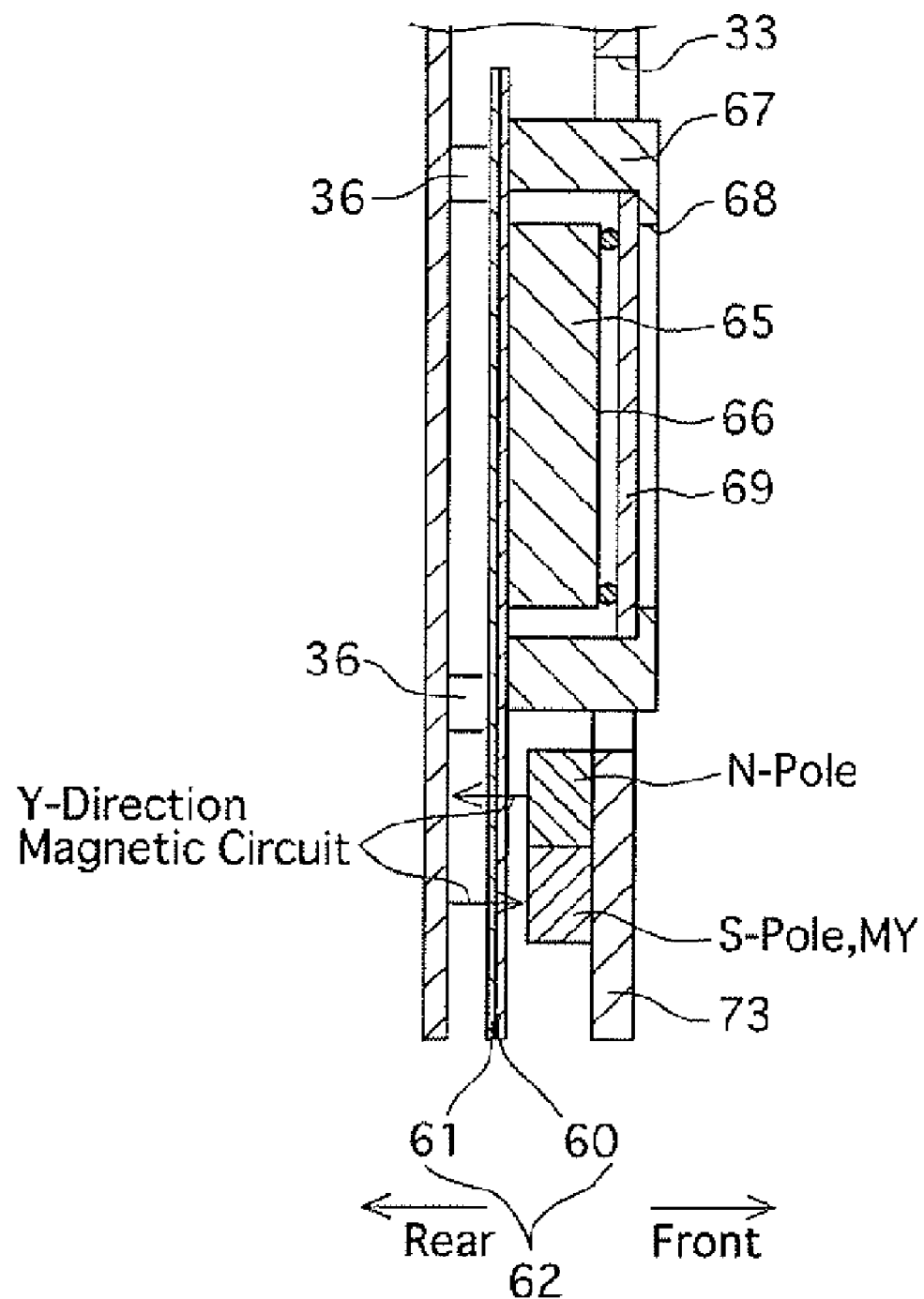
FIG. 6 is a cross sectional view taken along VI-VI line shown in FIG. 2.

A CCD holder 67 which surrounds the CCD 65 is fixed to the front of the electrical board 60 in an airtight fashion (dust-tight fashion). As shown in FIG. 6, the CCD holder 67 is provided on a front wall thereof with an aperture (through hole) 68 having a rectangular shape as viewed from the front of the camera-shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. An imaging surface 66 of the CCD 65 faces the optical low-pass filter 69 and the aperture 68 in the Z-direction at all times. The imaging surface 66 of the CCD 65 serves as an image-forming surface on which object light which is passed through the lenses L1, L2 and L3 and the optical low-pass filter 69 is formed as an object image. When the electrical board 60 (the movable stage 62) is in the initial position (when the electrical board 60 is in the state shown in FIG. 2), the center of the imaging surface 66 of the CCD 65 is positioned on the optical axis O.

The electrical board 60 is provided at horizontally opposite ends thereof with a right tongue portion 71 and a left tongue portion 72 which extend rightward and leftward, respectively, and is further provided at a lower end of the electrical board 60 with a lower tongue portion 73 which extends downward.

As shown in FIG. 2, the right tongue portion 71 and the left tongue portion 72 are positioned to correspond to the aforementioned right and left X-direction magnetic circuits, respectively (i.e., positioned to face the right and left X-direction magnets MX in the Z-direction, respectively).

Two planar X-direction drive coils CX having the same specifications are printed on the front surfaces of the right tongue portion 71 and the left tongue portion 72, respectively. The two X-direction drive coils CX lie in a plane parallel to an X-Y plane, are each wound in a coiled shape by over one hundred turns (i.e., are wound in both a direction parallel to the electrical board 60 and a thickness direction of the electrical board 60), and are aligned in a direction parallel to the pair of X-direction edges 65X of the CCD 65 (in the X-direction in the state shown in FIG. 2). In other words, the positions of the two X-direction drive coils CX are coincident with each other in the direction parallel to the pair of Y-direction edges 65Y (in the Y-direction in the state shown in FIG. 2).

Accordingly, the two X-direction drive coils CX, the front stationary support board 31, the rear stationary support board 32 and the two X-direction magnets MX constitute an X-direction driving device.

The lower tongue portion 73 is positioned to face the aforementioned two Y-direction magnetic circuits in the Z-direction.

Two planar Y-direction drive coils CYA and CYB having the same specifications are printed on the front surface of the lower tongue portion 73. The two Y-direction drive coils CYA and CYB lie in a plane parallel to the X-Y planer are each wound in a coiled shape by over one hundred turns (i.e., are wound in both a direction parallel to the electrical board 60 and a thickness direction of the electrical board 60), and are aligned along the lower x-direction edge 65X of the CCD 65 (in the X-direction in the state shown in FIG. 2). In other words, the positions of the two Y-direction drive coils CYA and CYB are coincident with each other in the direction parallel to the pair of Y-direction edges 65Y (in the Y-direction in the state shown in FIG. 2).

Accordingly, the two Y-direction drive coils CYA and CYB, the front stationary support board 31, the rear stationary support board 32 and the two Y-direction magnets MY constitute an Y-direction driving device.

The two X-direction drive coils CX, and the two Y-direction drive coils CYA and CYB are electrically connected to a controller constructed From a CPU, etc., provided inside the digital camera 20.

The camera-shake correction apparatus 30 carries out camera-shake (hand-shake) correction operations by supplying electric current through the two X-direction drive coils CX, and the two Y-direction drive coils CYA and CYB.

In other words, if electric current is supplied to the X-direction drive coils CX, a linear drive force acting in either direction FX1 or direction FX2 occurs in the X-direction drive coils CX, as shown in FIG. 2. Similarly, if electric current is supplied to the Y-direction drive coils CYA and CYB, a linear drive force acting in the either direction FY1 or direction FY2 occurs in the Y-direction drive coils CYA and CYB.

As is commonly known in the art, when a camera body is shaken/vibrated in the X-direction or the Y-direction due to hand-shake (camera shake), the amount of movement of the camera body (amount of hand-shake) in the X-direction and the Y-direction is detected, and if the CCD 65 is linearly moved with respect to the camera body by the same amount as the detected amount of hand-shake but in the opposite direction, the hand-shake (camera shake/image shake) of the CCD 65 is corrected. Accordingly, in order for the CCD 65 to be linearly moved in such a manner, if electric current is supplied from the controller to the two X-direction drive coils CX, and the two Y-direction drive coils CYA and CYB, camera shake applied to the CCD 65 in the X-direction and Y-direction is corrected.

Furthermore, since the movable stage 62 (CCD 65) is rotatable relative to the front stationary support board 31 and the rear stationary support board 32, if the direction of the electric current supplied to the Y-direction drive coil CYA and the Y-direction drive coil CYB are made mutually opposite so that mutually opposite driving forces occur between the Y-direction drive coil CYA and the Y-direction drive coil CYB, the movable stage 62 (CCD 65) is rotated. Accordingly, when rotational shake (rotational camera shake) occurs to the camera body of the digital camera 20, this rotational shake can be corrected if electric current is supplied from the controller to the Y-direction drive coil CYA and the Y-direction drive coil CYB so that the movable stage 62 (CCD 65) is rotated in a rotational direction opposite to the rotational direction of the rotational shake.

The lock mechanism 100 according to the present invention which is installed in the camera-shake correction apparatus 30 will be hereinafter described with reference mainly to FIGS. 2 through 5.

The lock mechanism 100 includes elements which will be described hereinafter.

The front stationary support board 31 is provided at the upper and right edge portions thereof with a support projection 101 and a mounting portion 102 which are formed to project upward and rightward, respectively. The support projection 101 and the mounting portion 102 are provided on rear surfaces thereof with a column-shaped rotation limiting pin 103 and a column-shaped guide pin 104, respectively, which project rearward.

The movable stage 62 is provided at the upper and right edge portions thereof with a projection 106 and a projection 107 which are elements of the movable stage 62 and are formed to project upward and rightward, respectively. A lock hole 108 having a circular shape as viewed from front is formed in the projection 106. Likewise, a lock hole 109 having a circular shape as viewed from front is made in the projection 107.

The lock mechanism 100 is provided with a lock member 110 having a substantially L shape as viewed from front (see FIG. 2). The lock member 110 is provided with an X-direction elongated portion 111 and a Y-direction elongated portion 112. In the state shown in FIG. 2, the X-direction elongated portion 111 is elongated parallel to the upper edge of the movable stage 62 (the electrical board 60 and the reinforcing plate 61), i.e., an X-direction edge of the movable stage 62 that is parallel to the pair of X-direction edges 65X, while the Y-direction elongated portion 112 is elongated parallel to the right edge of the movable stage 62 (the electrical board 60 and the reinforcing plate 61), i.e., a Y-direction edge of the movable stage 62 that is parallel to the pair of X-direction edges 65Y. The lock member 110 is positioned circumferentially outside of the movable stage 62 (except the projections 106 and 107), and is positioned between the rear stationary support board 32 and the reinforcing plate 61 as viewed laterally from one side of the movable stage 62. The X-direction elongated portion 111 is provided with a rotation limiting hole 114 which is elongated in the X-direction and in which the rotation limiting pin 103 is slidably engaged, and the Y-direction elongated portion 112 is provided with a circular hole (guide hole) 115 in which the guide pin 104 is slidably engaged. Due to the slidable engagement between the circular hole 115 and the guide pin 104, the lock member 110 is slidingly movable in a direction parallel to the optical axis O along the guide pin 104, and is linearly movable between the unlocked position shown in FIG. 4 and the locked position shown in FIG. 5. Additionally, the slidable engagement of the rotation limiting hole 114 with the rotation limiting pin 103 prevents the lock member 110 from rotating about the guide pin 104.

Figure 8:
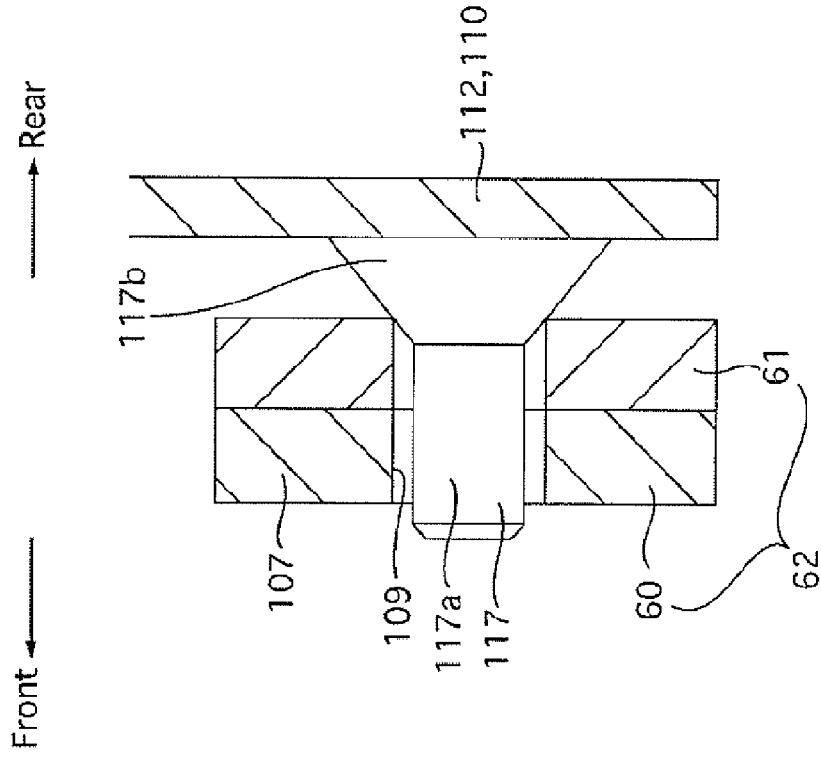
FIG. 8 is a cross sectional view taken along VIII-VIII line shown in FIG. 2.
Figure 7:
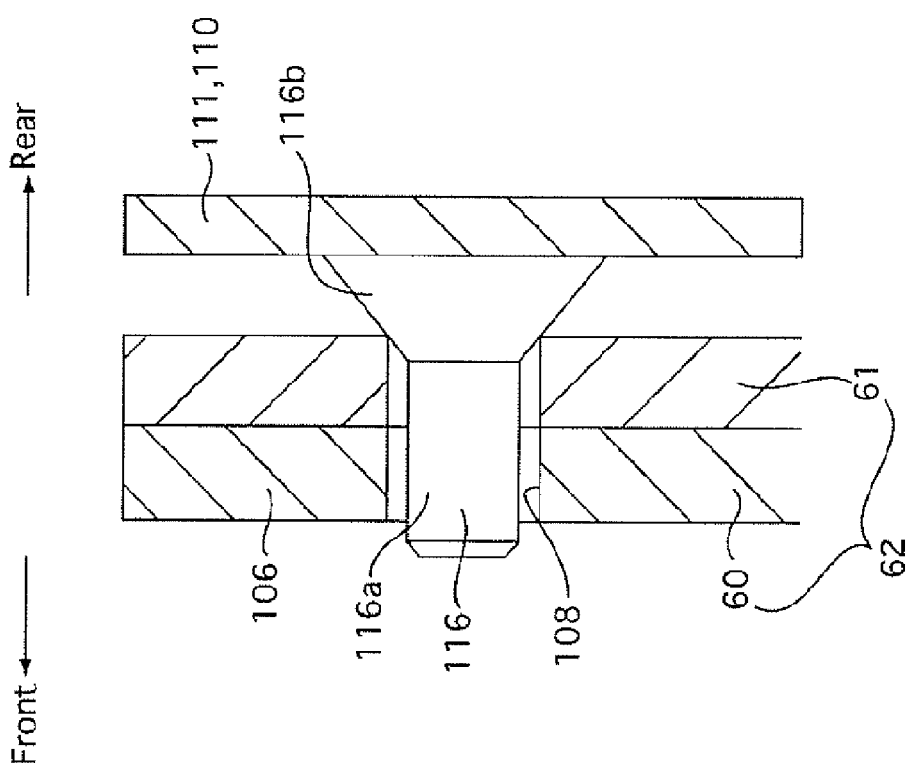
FIG. 7 is a cross sectional view taken along VII-VII line shown in FIG. 2.

The lock member 110 is provided, on the front surface thereof at two positions thereon facing the lock hole 108 and the lock hole 109, with a lock pin 116 and a lock pin 117 which extend forward to be capable of being engaged and disengaged in and from the lock hole 108 and the lock hole 109, respectively. As shown in FIGS. 7 and 8, the lengths of the lock pins 116 and 117 are greater than the thickness of the movable stage 62 in the direction parallel to the optical axis O so that the ends of the lock pins 116 and 117 slightly project forward from the front ends of the lock holes 108 and 109, respectively, when the movable stage 62 is in the locked position shown in FIG. 5. The lock pin 116 is provided with a truncated conical portion 116b which is fixed to the X-direction elongated portion 111 of the lock member 110, and is further provided with a cylindrical portion 116a which projects forward from the front end of the truncated conical portion 116b. Likewise, the lock pin 117 is provided with a truncated conical portion 117b which is fixed to the Y-direction elongated portion 112 of the lock member 110, and is provided with a cylindrical portion 117a which projects forward from the front end of the truncated conical portion 117b. The shape of the cylindrical portion 116a is in the shape of a cylinder which is smaller in diameter than the lock hole 108, while the shape of the cylindrical portion 117a is in the shape of a cylinder which is smaller in diameter than the lock hole 109. The truncated conical portion 116b is in the shape of a truncated cone, the diameter of which increases in a direction toward the lock member 110 and the maximum diameter of which is greater than the diameter of the lock hole 108. Likewise, the truncated conical portion 117b is in the shape of a truncated cone, the diameter of which increases in a direction toward the lock member 110 and the maximum diameter of which is greater than the diameter of the lock hole 109. When the lock member 110 is in the unlocked position, the lock pins 116 and 117 are disengaged from the lock holes 108 and 109, respectively (see FIG. 4). On the other hand, when the lock member 110 is in the locked position in a state where the movable stage 62 is in the initial position shown in FIG. 2, the lock pins 116 and 117 are engaged in the lock holes 108 and 109 from the rear of the movable stage 62 (see FIG. 5) with no gap between the truncated conical portions 116b and 117b and the lock holes 108 and 109, respectively. Therefore, when the lock member 110 is in the locked position in a state where the movable stage 62 is in the initial position shown in FIG. 2, play between the lock pin 116 and the lock hole 108 and play between the lock pin 117 and the lock hole 109 are removed while the movable stage 62 are prevented from either rotating or moving linearly, so that the movable stage 62 (the CCD 65, the electrical board 60 and the reinforcing plate 61) cannot perform the camera-shake correction operation thereof.

A mounting plate 120 having the shape of a letter L in plan view (as viewed in FIGS. 4 and 5) is fixed to the mounting portion 102 of the front stationary support board 31. The lock mechanism 100 is provided with a motor (driving device) 123, a body portion of which is fixed to an outside surface of a mounting piece 121 of the mounting plate 120 which extends in a direction orthogonal to the movable stage 62. The motor 123 has a rotary shaft 124 which projects upward from the upper end of the motor 123. The axis of the rotary shaft 124 is parallel to the pair of Y-direction edges 65Y of the CCD 65. An attachment piece (engaging member) 125 is integrally fixed to the rotary shaft 124. The attachment piece 125 is provided with a pair of holding pieces (front and rear holding pieces) 126 between which a part of the Y-direction elongated portion 112 of the lock member 110 is loosely engaged as shown in FIGS. 4 and 5. The motor 123 is electrically connected to the aforementioned controller.

The operation of the above-described lock mechanism 100 will be discussed hereinafter.

When a camera-shake correction switch SW (shown in FIG. 1), provided on the camera body, is OFF, the movable stage 62 is at the initial position (non-operational state) as shown in FIG. 2, and no driving signal is supplied to the motor 123 from the aforementioned controller. At this time, since the attachment piece 125 is in the state shown in FIG. 5 and the rear holding piece 126 presses the Y-direction elongated portion 112 (the lock member 110) forward, the lock member 110 is in the locked position shown in FIG. 5 while the lock pins 116 and 117 are engaged in the lock holes 108 and 109, respectively, to thereby hold (lock) the movable stage 62 at the aforementioned initial position. Therefore, even if the digital camera 20 is shaken, the movable stage 62 does not move relative to the camera body.

In this engaged position, if the camera-shake correction switch SW is turned ON, a driving signal is supplied to the motor 123 from the aforementioned controller so that the rotary shaft 124 of the motor 123 rotates counterclockwise as viewed in FIGS. 4 and 5. Thereupon, the attachment piece 125 rotates so that the front holding piece 126 brings the Y-direction elongated portion 112 of the lock member 110 to the aforementioned unlocked position. Thereby the lock pins 116 and 117 are disengaged from the lock holes 108 and 109 rearward from the rear ends thereof, respectively, and accordingly, the movable stage 62 becomes movable again relative to the four support cylindrical columns 36 to the aforementioned predetermined range of movement, in which the four support cylindrical columns 36 are not in contact with the inner walls of the four moving range limiting holes 63, respectively.

Upon the camera-shake correction switch SW being turned OFF after the completion of the camera-shake correction operation, the movable stage 62 returns to the initial position thereof via control of the controller, and a return signal is supplied to the motor 123 from the controller to rotate the rotary shaft 124 of the motor 123 clockwise as viewed in FIGS. 4 and 5. Thereupon, the rear holding piece 126 of the attachment piece 125 brings the Y-direction elongated portion 112 of the lock member 110 back to the lock position again so that the lock pins 116 and 117 are engaged in the lock holes 108 and 109, respectively, to hold the movable stage 62 at the initial position.

As can be understood from the above description, according to the above illustrated embodiment of the lock mechanism 100, the movable stage 62 (the electrical board 60 and the reinforcing plate 61) which is in the initial position can be securely locked by the lock mechanism 100. Elements of the lock mechanism 100 include the lock holes 108 and 109, the lock member 110, the lock pins 116 and 117, the motor 123 and the attachment piece 125.

Moreover, the cylindrical portions 116a and 117a of the lock pins 116 and 117 do not disengage from the lock holes 108 and 109 even if the movable stage 62 is slidingly moved by a large force since the cylindrical portions 116a and 117a of the lock pins 116 and 117 are respectively engaged in the lock holes 108 and 109 when the movable stage 62 is locked by the lock mechanism 100 as shown in FIGS. 7 and 8.

Furthermore, since the movable stage 62 is locked by the engagement of the lock pins 116 and 117 with the lock holes 108 and 109, respectively, the locked state of the movable stage 62 which is stronger than the locked state of a movable stage, locked by a conventional lock mechanism which locks the movable stage by the engagement of one engaging recess with corresponding one engaging member, is achieved.

Additionally, since the movable stage 62 (the CCD 65, the electrical board 60 and the reinforcing plate 61) is rotatable relative to the front stationary support board 31 and the rear stationary support board 32, the movable stage 62 (the CCD 65, the electrical board 60 and the reinforcing plate 61) cannot be prevented from rotating if the lock mechanism is provided with only one lock pin like a conventional lock mechanism. However, if the lock mechanism is constructed so that the movable stage is locked by the engagement of a pair of lock pins with a pair of lock holes like the engagement of the pair of lock pins 116 and 117 with the pair of lock holes 108 and 109, the movable stage 62 (the CCD 65, the electrical board 60 and the reinforcing plate 61) can be prevented from rotating, and accordingly, the lock mechanism 100 makes full use of special usability thereof by being applied to a camera-shake correction apparatus capable of correcting rotational shake.

Additionally, since the lock member 110 is positioned between the reinforcing plate 61 and the rear stationary support board 32 as viewed laterally from one side of the movable stage 62 and since the motor 123 is installed beside the movable stage 62 (on the periphery thereof), the camera-shake correction apparatus 30 and the digital camera 20 do not become large in size in the direction of the optical axis O (optical axis direction/the Z-direction), which makes it possible to achieve a reduction in thickness of the camera-shake correction apparatus 30 and the digital camera 20 by a greater amount than before.

Additionally, since the lock mechanism 100 has a simple structure, it is possible to reduce the cost of production to a minimum.

Additionally, since the lock pins 116 and 117 are formed to project from the lock member 110, rather than from the movable stage 62 (either the electrical board 60 or the reinforcing plate 61), the weight of the movable stage 62 does not increase by the weight of the lock pins 116 and 117. Therefore, it is easy to control movements of the movable stage 62, and the camera-shake correction operation can be performed with a higher degree of precision than in the case where the lock pins 116 and 117 are formed to project from the movable stage 62.

In addition, no force acting in the optical axis direction is exerted on the movable stage 62 from the lock member 110 (either from the lock pins 116 or 117). Therefore, when the movable stage 62 is locked, the CCD 65 does not move in the optical axis direction, so that no influence is exerted upon a focus on the CCD 65.

A second embodiment of the camera-shake correction apparatus which incorporates a second embodiment of the lock mechanism according to the present invention will be hereinafter discussed with reference mainly to FIGS. 9 through 13. Elements of the second embodiment of the camera-shake correction apparatus which are similar to those of the first embodiment of the camera-shake correction apparatus are designated by the same reference numerals, and a detailed description for such elements are omitted from the following description.

The structure of the lock mechanism 200 will be discussed hereinafter.

The lock mechanism 200 is provided with a mounting plate 201 having the shape of a letter L which is fixed to a rear surface of the front stationary support board 31 in the vicinity of the lower right corner thereof. The lock mechanism 200 is provided with a motor (driving device) 203 a body portion of which is fixed to a mounting piece 202 of the mounting plate 201 which extends in a direction orthogonal to the movable stage 62. The motor 203 is positioned beside the movable stage 62 on the periphery thereof. The motor 203 has a rotary shaft 204 the axis of which is parallel to the Y-direction. An attachment piece (engaging member) 205 is integrally fixed to the rotary shaft 204.

Figure 13:
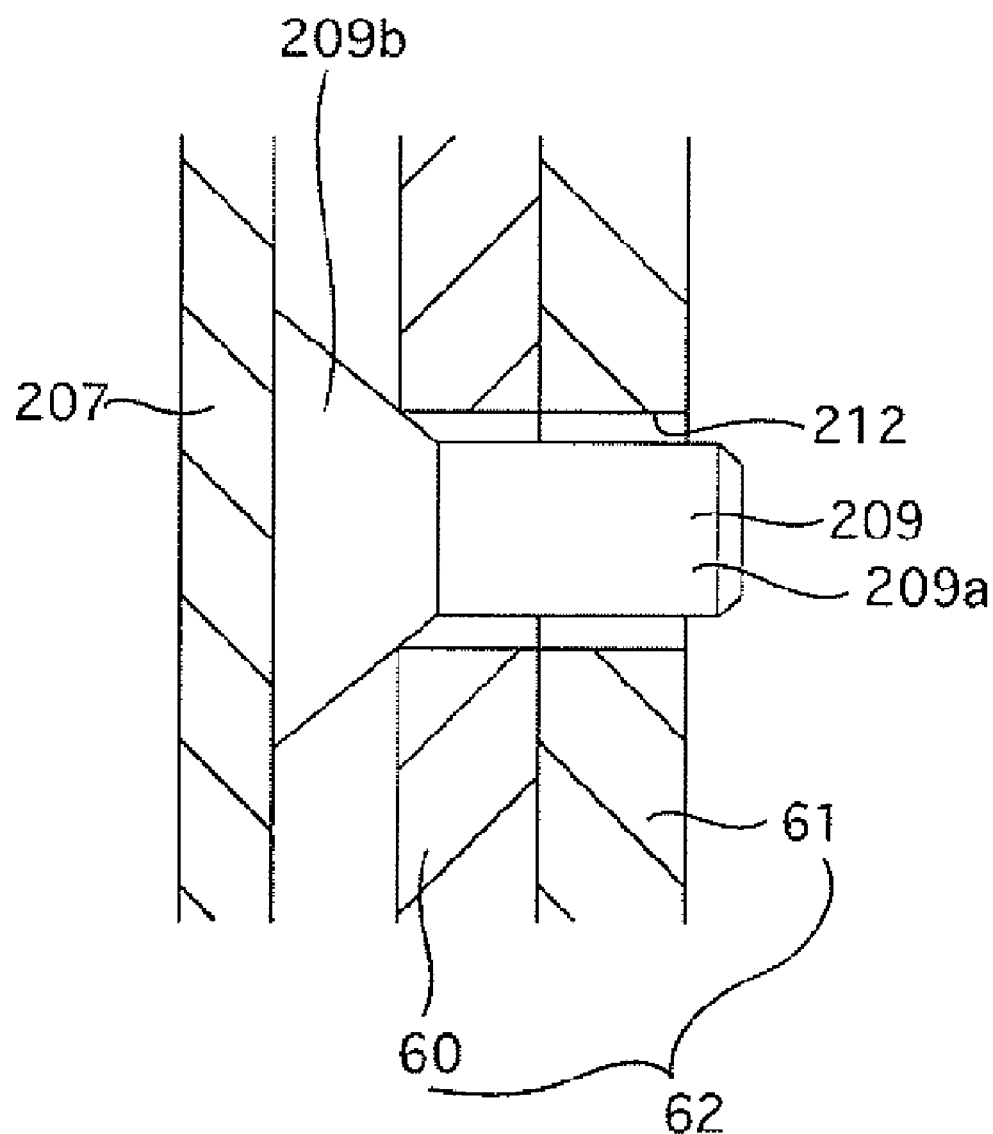
FIG. 13 is a cross sectional view taken along XIII-XIII line shown in FIG. 11.
Figure 14:
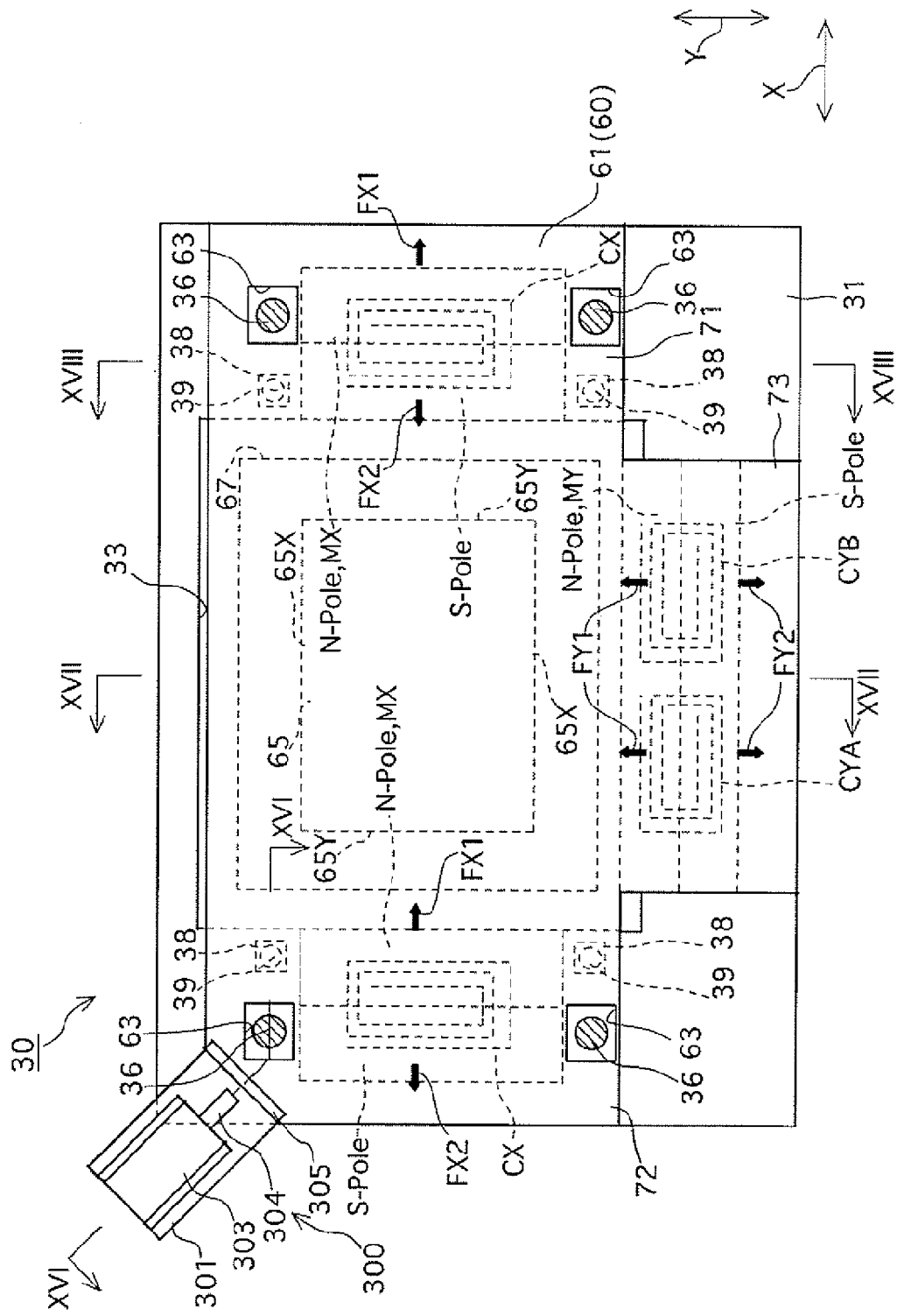
FIG. 14 is a rear elevational view of a third embodiment of the camera-shake correction apparatus in an unlocked state, with a rear stationary support board omitted for clarity.
Figure 15:
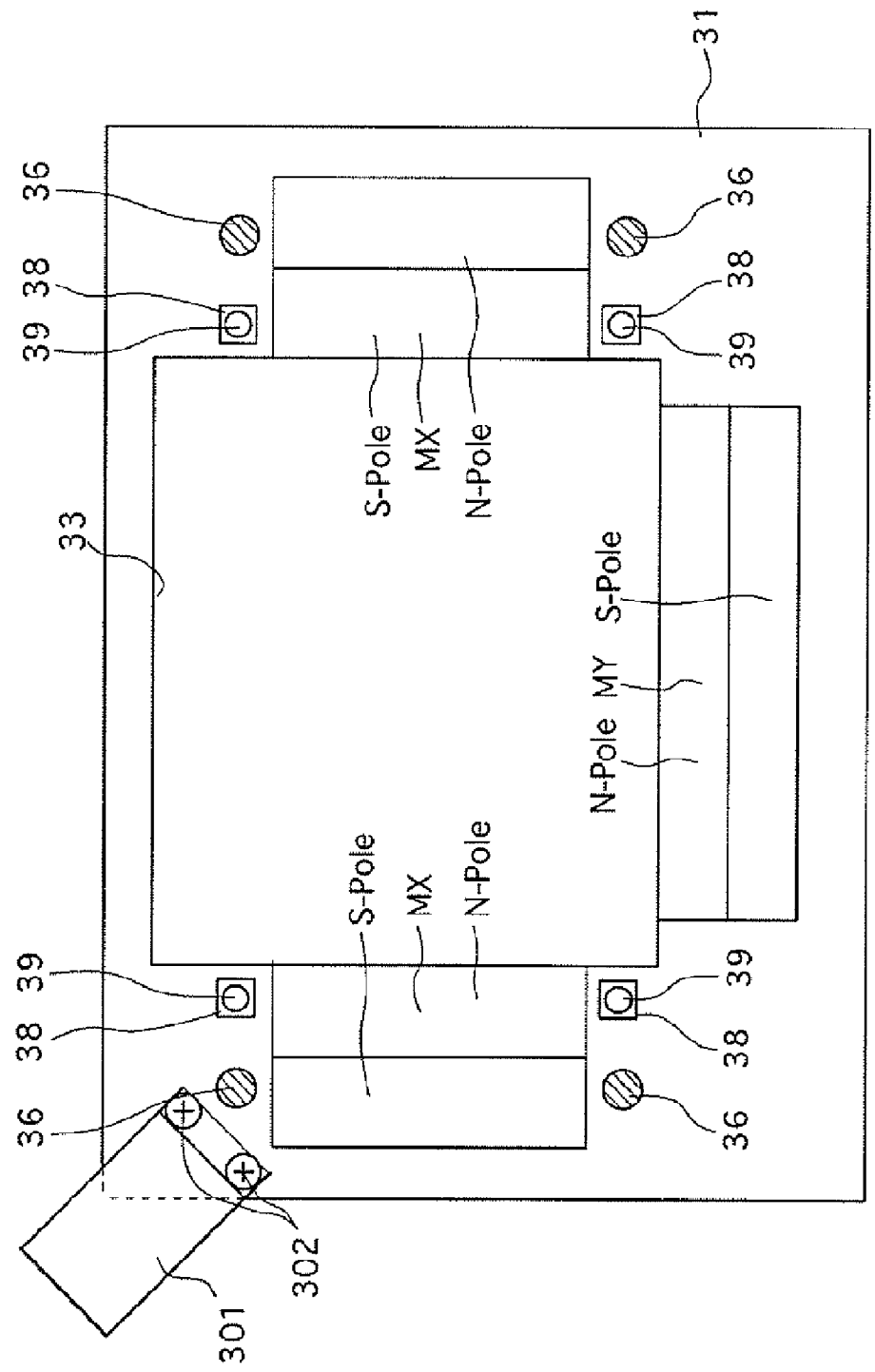
FIG. 15 is a rear elevational view of a front stationary support board and fixing members thereof in the third embodiment of the camera-shake correction apparatus.

The attachment piece 205 is provided with a fixed portion 206 having a substantially column shape which is fixed to the rotary shaft 204, and is further provided with a rotating plate (lock member) 207 which is integral with the fixed portion 206 to extend in a radial direction of the rotary shaft 204. The rotating plate 207 is provided, on the left edge thereof at upper and lower ends thereof, with a pair of projections (upper and lower projections) 208, and two lock pins 209, each having a substantially column shape projecting rearward from the rear surfaces of the pair of projections 208, respectively. As shown in FIG. 13, the lengths of the lock pins 209 are greater than the thickness of the movable stage 62 in the direction parallel to the optical axis O so that the ends of the lock pins 209 slightly project rearward from the rear ends of lock holes 212 formed in the movable stage 62, respectively, when the movable stage 62 is in the locked position as shown in FIG. 11.

The movable stage 62 is provided on the right side of the right tongue portion 71 with a projecting portion (an element of the movable stage 62) 211 having a rectangular shape which is smaller in size than the right tongue portion 71 and which projects rightward from the right edge of the right tongue portion 71. The aforementioned lock holes 212 are formed in the projecting portion 211 of the movable stage 62. As shown in FIG. 13, each lock pin 209 is provided with a truncated conical portion 209b which is fixed to the rotating plate 207 (projection 208), and a cylindrical portion 209a which projects rearward from the rear end of the truncated conical portion 209b. The shape of each cylindrical portion 209a is in the shape of a cylinder which is smaller in diameter than the associated lock hole 212. The truncated conical portion 209b is in the shape of a truncated cone the diameter of which increases in a direction toward the rotating plate 207 and the maximum diameter of which is greater than the diameter of the associated lock hole 212.

The operation of the above-described lock mechanism 200 will be discussed hereinafter.

When the camera-shake correction switch SW is OFF, the movable stage 62 is at the initial position as shown in FIG. 9, and no driving signal is supplied to the motor 203 from the aforementioned controller. At this time, the rotary shaft 204 and the attachment piece 205 are in the state shown in FIG. 11 in which the lock pins 209 are positioned in the lock position so as to be engaged in the lock holes 212 of the projecting portion 211 from the front thereof (with no gap between the truncated conical portions 209b of the two lock pins 209 and the two lock holes 212, respectively, as shown in FIG. 13). Therefore, when the lock pins 209 are in a locked position shown in FIG. 11 in a state where the movable stage 62 is in the initial position shown in FIG. 9, the movable stage 62 is held (locked) in the aforementioned initial position, and accordingly, the movable stage 62 does not move relative to the camera body even if the digital camera 20 is shaken.

In this state, if the camera-shake correction switch SW is turned ON, a driving signal is supplied to the motor 203 from the aforementioned controller so that the rotary shaft 204 of the motor 203 rotates clockwise as viewed in FIGS. 11 and 12. Thereupon, the rotating plate 207 rotates with the rotary shaft 204 in the same rotation direction, so that the upper and lower lock pins 209 move to the unlocked positions thereof shown in FIG. 12, thus disengaging forward from the upper and lower lock holes 212, respectively. Accordingly, the movable stage 62 becomes movable again relative to the four support cylindrical columns 36 within the aforementioned predetermined range of movement in which the four support cylindrical columns 36 do not come in contact with the inner edges of the four moving range limiting holes 63, respectively.

Upon the camera-shake correction switch SW being turned OFF after the completion of the camera-shake correction operation, the movable stage 62 returns to the initial position thereof by control of the aforementioned controller, and a return signal is supplied to the motor 203 from the aforementioned controller to rotate the rotary shaft 204 of the motor 203 counterclockwise as viewed in FIGS. 11 and 12. Thereupon, the upper and lower lock pins 209 move back to the locked positions to be re-engaged in the upper and lower lock holes 212, respectively, to hold the movable stage 62 at the initial position.

An effect similar to that obtained by the adoption of the first embodiment of the lock mechanism 200 can also be obtained by the adoption of the second embodiment of the lock mechanism 100.

Moreover, since the motor 203 and the attachment 205 are installed beside the movable stage 62 on the periphery thereof, and since the rotating plate 207 is positioned between the electrical board 60 and the front stationary support board 31 as viewed laterally from one side of the movable stage 62, the camera-shake correction apparatus 30 and the digital camera 20 do not become large in size in the direction of the optical axis O.

A third embodiment of the camera-shake correction apparatus which incorporates a third embodiment of the lock mechanism according to the present invention will be hereinafter discussed with reference mainly to FIGS. 14 through 20. Elements of the third embodiment of the camera-shake correction apparatus which are similar to those of the first embodiment of the camera-shake correction apparatus are designated by the same reference numerals, and a detailed description for such elements are omitted from the following description.

The third embodiment of the lock mechanism 300 includes the aforementioned four support cylindrical columns 36, the corresponding four moving range limiting holes 63, a linear-type stepping motor 303 (which includes an output shaft 304) and an engaging piece 305. In the third embodiment of the lock mechanism 300, the four support cylindrical columns 36 serve as lock pins and the four moving range limiting holes 63 serve as lock holes.

Figure 16:
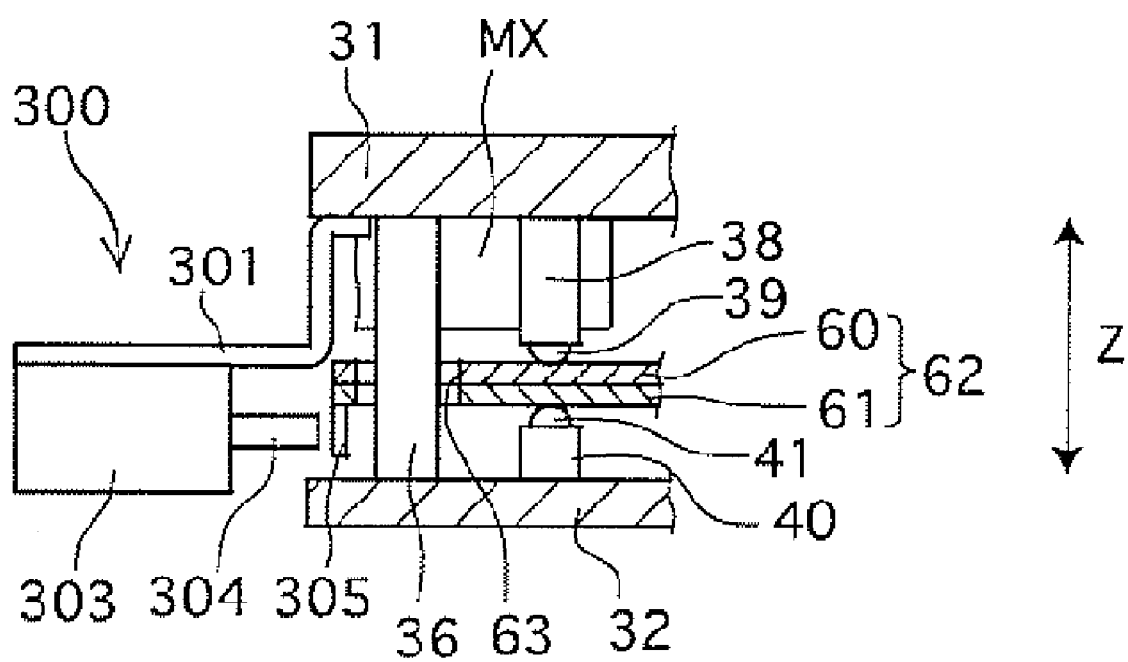
FIG. 16 is a cross sectional view taken along XVI-XVI line shown in FIG. 14.
Figure 20:
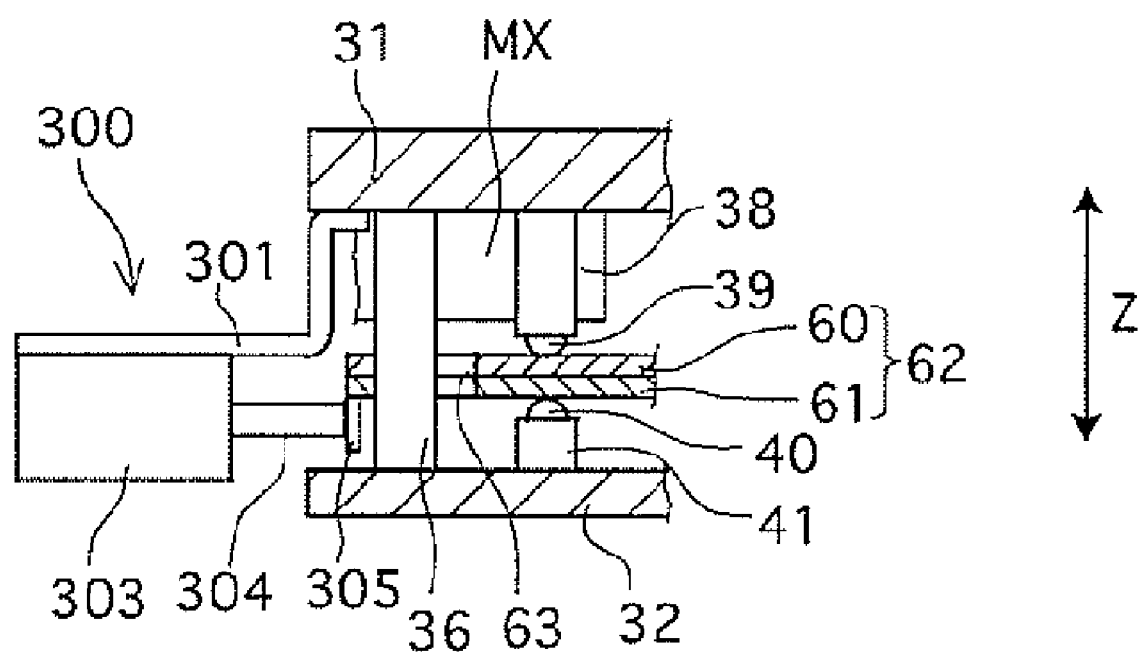
FIG. 20 is a cross sectional view, similar to that shown in FIG. 16, of the third embodiment of the camera-shake correction apparatus in the locked state.

The lock mechanism 300 is provided at the upper left corner of the front stationary support board 31 with a bracket (motor bracket) 301 which is secured to the front stationary support board 31 by two set screws 302 (see FIG. 15) so that the bracket 301 extends obliquely outwards in a diagonal direction with respect to the front stationary support board 31. As shown in FIGS. 16 and 20, the bracket 301 is bent into substantially a right angle to have the shape of substantially a letter L as viewed laterally from one side of the movable stage 62. The linear-type stepping motor (driving device/motor) 303 is fixedly mounted to a rear surface of the bracket 301. The linear-type stepping motor 303 has an output shaft (driving device) 304, the axis of which is parallel to the bracket 301 (parallel to the movable stage 62 (the electrical board 60 and the reinforcing plate 61)) and extends along a 45 degree angle with respect to the X-direction and the Y-direction.

As shown in FIGS. 16 and 20, the linear-type stepping motor 303 lies on the periphery of the movable stage 62 in a plane in which the movable stage 62 lies. The linear-type stepping motor 303 is electrically connected to the aforementioned controller. Upon a driving signal being supplied to the linear-type stepping motor 303 from the aforementioned controller, the linear-type stepping motor 303 moves the output shaft 304 forward or backward along the axis thereof.

The lock mechanism 300 is further provided with a contacting piece 305 which projects rearward from the upper left corner of the reinforcing plate 61.

The operation of the above-described lock mechanism 300 will be discussed hereinafter.

Figure 19:
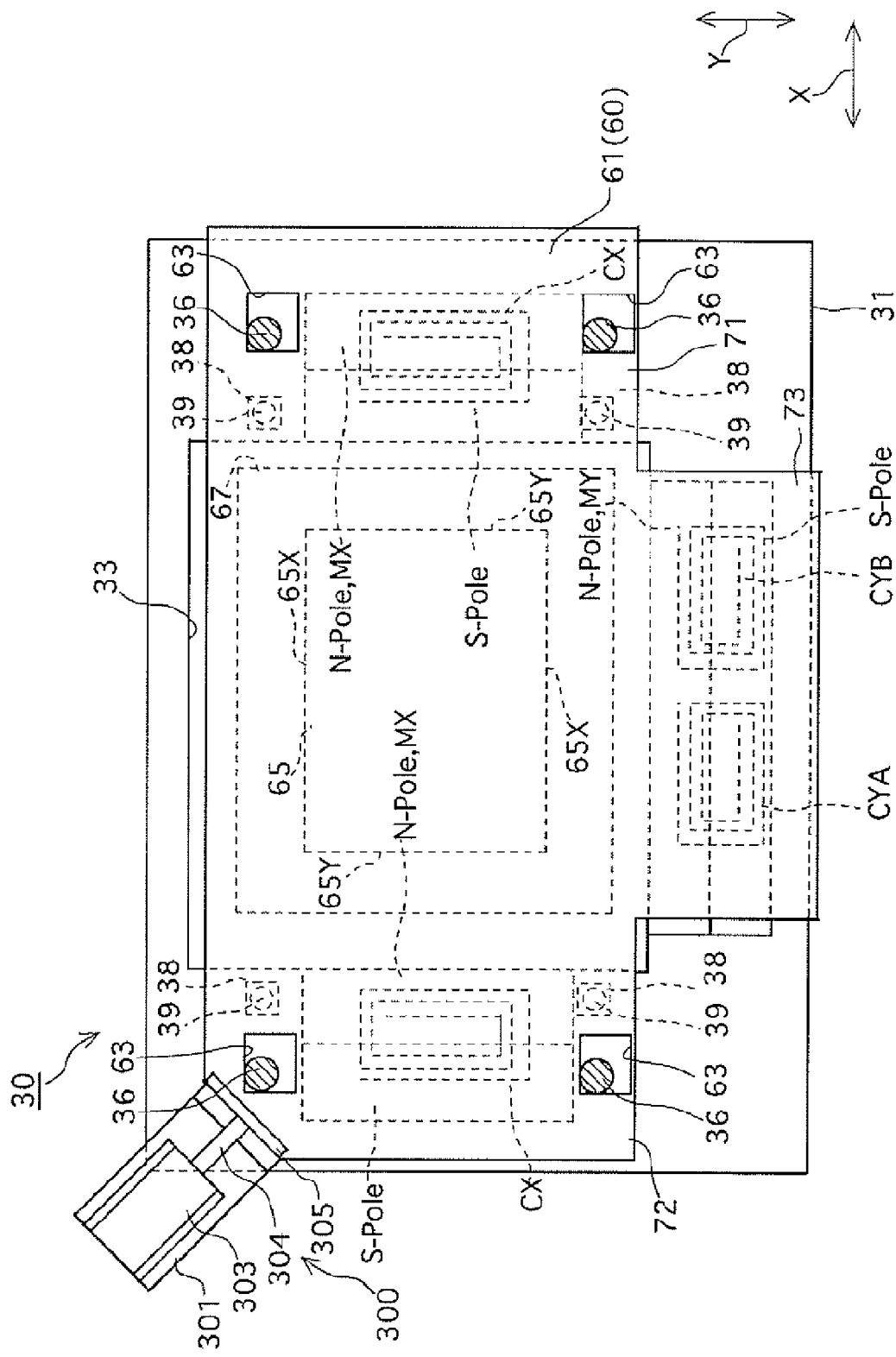
FIG. 19 is a rear elevational view of the third embodiment of the camera-shake correction apparatus in a locked state, with the rear stationary support board thereof omitted for clarity.

When the main power supply of the digital camera 20 is OFF, no driving signal is supplied to the linear-type stepping motor 303 from the aforementioned controller. Accordingly, as shown in FIGS. 19 and 20, the output shaft 304 is in a jutting state where the output shaft 304 juts out from the body of the linear-type stepping motor 303 to the contacting piece 305 so that the end of the output shaft 304 presses against the contacting piece 305 to bias the contacting piece 305 obliquely rightwardly downwards as viewed in FIG. 19. Accordingly, the movable stage 62 is in the locked position shown in FIGS. 19 and 20 while the upper left corners in the four moving range limiting holes 63 are in pressing contact with the four support cylindrical columns 36, respectively, as shown in FIG. 19. Accordingly, the movable stage 62 is locked, and the movable stage 62 does not move (rattle) relative to the camera body even if the digital camera 20 is shaken.

In this state, if the main power supply of the digital camera 20 is turned ON, a driving signal is supplied to the linear-type stepping motor 303 from the aforementioned controller so that the output shaft 304 of the linear-type stepping motor 303 retracts into the body of the linear-type stepping motor 303. Thereby, the end of the output shaft 304 is disengaged from the engaging piece 305. Additionally, an electric current is passed through the two X-direction drive coils CX and the two Y-direction drive coils CYA and CYB from the aforementioned controller so that the movable stage 62 moves to a photographic initial position thereof shown in FIG. 14. Accordingly, the movable stage 62 becomes movable again relative to the four support cylindrical columns 36 to the aforementioned predetermined range of movement in which the four support cylindrical columns 36 do not come in contact with the inner edges of the four moving range limiting holes 63, respectively.

Upon the main power supply of the digital camera 20 being turned OFF after the completion of the camera-shake correction operation, the movable stage 62 temporarily returns to the photographic initial position thereof by control of the aforementioned controller. In addition, a return signal is supplied to the linear-type stepping motor 303 from the aforementioned controller to make the output shaft 304 jut out to the position shown in FIGS. 19 and 20. Therefore, the end of the output shaft 304 again biases the engaging piece 305 obliquely rightwardly downwards so that the movable stage 62 is held at the locked position.

As can be understood from the above description, according to the third embodiment of the lock mechanism, the movable stage 62 (the electrical board 60 and the reinforcing plate 61) which is in an non-operational state can be securely locked by the lock mechanism 300 that includes the four support cylindrical columns 36, the four moving range limiting holes 63, the linear-type stepping motor 303 (the output shaft 304) and the engaging piece 305.

Moreover, since the linear-type stepping motor 303 (the output shaft 304) is installed beside the movable stage 62 (on the periphery thereof), the camera-shake correction apparatus 30 and the digital camera 20 do not become large in size in the direction of the optical axis O.

Furthermore, since the lock mechanism 300 does not have a structure of a pin (lock pin) projecting from the electrical board 60 or the reinforcing plate 61, the weight of the movable stage 62 does not increase by the weight of such a lock pin. Therefore, it is easy to control movements of the movable stage 62, and accordingly, the camera-shake correction operation can be performed with precision.

Furthermore, since the movable stage 62 is locked via the engagement of the four moving range limiting holes 63 with the four support cylindrical columns 36, respectively, the movable stage 62 can be locked more securely than before, as compared with a conventional case where a movable stage is locked by the engagement of a single boss (pin) in an engaging recess or the like.

Furthermore, since the movable stage 62 (the CCD 65, the electrical board 60 and the reinforcing plate 61) is rotatable relative to the front stationary support board 31 and the rear stationary support board 32, the movable stage 62 (the CCD 65, the electrical board 60 and the reinforcing plate 61) cannot be prevented from rotating if the lock mechanism is provided with only one lock pin like a conventional lock mechanism. However, if the lock mechanism is constructed so that the movable stage is locked by the engagement of a plurality of columns with a plurality of lock holes like the engagement of the four support cylindrical columns 36 with the four moving range limiting holes 63 of the third embodiment of the present invention, the movable stage 62 (the CCD 65, the electrical board 60 and the reinforcing plate 61) can be prevented from rotating, and accordingly, this particular functionality of the lock mechanism 300 can be fully utilized by being applied to a camera-shake correction apparatus capable of correcting rotational shake.

Furthermore, since the lock mechanism 300 has a simple structure, it is possible to reduce the cost of production to a minimum.

Furthermore, it is possible that the camera-shake correction operation be controlled by switching the camera-shake correction switch SW (see FIG. 1) between ON and OFF in a state where the main power supply of the digital camera 20 is ON.

Furthermore, a force acting in a direction parallel to the movable stage 62 is exerted on the movable stage 62 from the linear-type stepping motor 303 (the output shaft 304) while no force acting in the optical axis direction is exerted on the movable stage 62 from the linear-type stepping motor 303 (the output shaft 304). Therefore, when the movable stage 62 is locked, the CCD 65 does not move in the optical axis direction, so that there is no influence on the focus state of the CCD 65 when the main power supply is ON with the camera-shake correction switch SW is OFF. Although in the third embodiment of the present invention the shape of the four moving range limiting holes 63 are all rectangular with the vertical angles thereof being at right-angles so as to limit the moving range, it is possible to form the four moving range limiting holes as equilateral triangles having acute angles, so as to include the moving range/in order to lock the movable stage 62 (i.e., in order to lock the corresponding four support cylindrical columns 36 in the triangular four moving range limiting holes).

Although the present invention has been discussed with reference to the specific embodiments described above, the present invention is not limited solely thereto; various changes can be made in these specific embodiments without departing from the scope of the invention claimed.

For instance, in the first and second embodiments of the camera-shake correction apparatuses, each of the motors 123 and 203 can be replaced by a different type of actuator; e.g., it is possible to make the lock member 110 move linearly between the locked position and the unlocked position with a solenoid instead of a motor.

Although the engaging piece 305 is pressed by the linear-type stepping motor 303 in the third embodiment of the camera-shake correction apparatus, it is possible that the engaging piece 305 be pressed by a different type of actuator (e.g., an piezoelectric element, a plunger or a solenoid).

Additionally, in the first embodiment of the camera-shake correction apparatus, it is possible that two lock pins corresponding to the two lock pins 116 and 117 be formed on the movable stage 62 and that two lock holes corresponding to the two lock holes 108 and 109 be made in the lock member 110. Likewise, in the second embodiment of the camera-shake correction apparatus, it is possible that two lock pins corresponding to the two lock pins 209 be formed on the movable stage 62 and that two lock holes corresponding to the two lock holes 212 be made in the rotating plate (lock member) 207. Furthermore, it is possible that the lock pins 116 and 117 be engaged in the lock holes 108 and 109 from the front ends thereof with the lock member 110 being positioned between the front stationary support board 31 and the two projections 106 and 107 in the first embodiment of the camera-shake correction apparatus. Additionally, it is possible that the two lock pins 209 be engaged in the two lock holes 212 from the rear ends thereof with the rotating plate 207 being positioned immediately behind the movable stage 62 in the second embodiment of the camera-shake correction apparatus.

Additionally, it is possible that moving range limiting holes corresponding to the moving range limiting holes 63 be made in the front stationary support board 31 or the rear stationary support board 32 and that support cylindrical columns corresponding to the support cylindrical columns 36 be formed on the movable stage 62 (the electrical board 60 and/or the reinforcing plate 61).

The number of the support cylindrical columns 36 and the number of the moving range limiting holes 63 are not limited solely to four.

An image pickup device other than the CCD 65 can he used, e.g., a CMOS imaging sensor can of course be alternatively used.

Furthermore, in the first and second embodiments of the camera-shake correction apparatuses, the number of lock pins and the number of lock holes are not limited solely to two; more than two is possible.

Additionally, in the first embodiment of the camera-shake correction apparatus, it is possible that a column-shaped rotation limiting pin and a column-shaped guide pin respectively corresponding to the column-shaped rotation limiting pin 103 and the column-shaped guide pin 104 be formed on the lock member 110, and that a rotation limiting hole and a circular hole respectively corresponding to the rotation limiting hole 114 and the circular hole 115 be formed in the front stationary support board 31 or the rear stationary support board 32. Additionally, it is possible that a column-shaped rotation limiting pin and a column-shaped guide pin respectively corresponding to the column-shaped rotation limiting pin 103 and the column-shaped guide pin 104 be formed on the rear stationary support board 32.

Furthermore, it is possible for the controller to operate so as to move the lock mechanism (100, 200 and 300) to the unlocked state upon the main power supply being turned ON or the release button being depressed in each of the first, second and third embodiments of the camera-shake correction apparatuses.

Furthermore, each of the above described first, second and third embodiments of the lock mechanisms can be applied to a convention camera-shake (hand-shake) correction apparatus which only linearly moves a movable stage along guide shafts, or the like, in the X-direction and the Y-direction, and can also be applied to a stage apparatus (an apparatus in which a specific member is linearly movable in the X-direction and/or Y-direction, or rotatable) having a different usage from that of a camera-shake correction apparatus.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lock mechanism for a stage apparatus, said stage apparatus having at least one stationary support board and a movable stage, wherein said movable stage is movable relative to said stationary support board in a plane parallel to said stationary support board, said lock mechanism comprising:
   a lock member positioned immediately one of in front of and behind said movable stage, said lock member being movable toward and away from said movable stage by moving in a direction substantially orthogonal to a direction of movement of said movable stage;
   a plurality of lock holes formed in opposed portions of one of said lock member and said movable stage;
   a plurality of lock pins formed on said opposed portions of the other of said lock member and said movable stage, wherein ends of said plurality of lock pins which are smaller in diameter than other portions thereof are capable of being engaged in and disengaged from said plurality of lock holes, respectively; and
   a driving device which moves said lock member toward said movable stage to engage said plurality of lock pins with said plurality of lock holes, respectively, upon said movable stage entering a non-operational state, and moves said lock member away from said movable stage to disengage said plurality of lock pins from said plurality of lock holes, respectively, upon said movable stage entering an operational state.

2. The lock mechanism for the stage apparatus according to claim 1, wherein said driving device is fixedly provided beside said movable stage at a periphery thereof.

3. The lock mechanism for the stage apparatus according to claim 1, wherein said plurality of lock holes are made in said movable stage, and
wherein said plurality of lock pins are formed on said lock member.

4. The lock mechanism for the stage apparatus according to claim 1, wherein said movable stage comprises an X-direction edge parallel to an X-direction and a Y-direction edge parallel to a Y-direction orthogonal to said X-direction, and
wherein said lock member is substantially L-shaped as viewed from the front thereof so as to have an X-direction elongated portion parallel to said X-direction edge and a Y-direction elongated portion parallel to said Y-direction edge.

5. The lock mechanism for the stage apparatus according to claim 4, wherein said driving device comprises a motor having a rotary shaft, an axis of which is parallel to said Y-direction,
wherein said lock mechanism further comprises:
an engaging member which is fixed to said rotary shaft and holds said lock member at opposite sides thereof, and
wherein rotational motion of said rotary shaft is converted to linear motion to be transferred to said lock member via said engaging member so that said lock member moves in said direction toward and away from said movable stage when said rotary shaft rotates.

6. The lock mechanism for the stage apparatus according to claim 1, wherein a guide hole is formed in one of said lock member and said stationary support board, and
wherein the other of said lock member and said stationary support board includes a guide pin which extends in a direction orthogonal to said movable stage to be engaged in said guide hole to guide said lock member in a direction toward and away from said movable stage.

7. The lock mechanism for the stage apparatus according to claim 1, wherein said driving device comprises a motor having a rotary shaft, an axis of which is parallel to said movable stage, and
wherein said lock member comprises a rotating plate fixed to said rotary shaft.

8. The lock mechanism for the stage apparatus according to claim 7, wherein said movable stage comprises an X-direction edge parallel to an X-direction and Y-direction edge parallel to a Y-direction orthogonal to said X-direction, and
wherein said rotary shaft of said motor is parallel to said Y-direction.

9. The lock mechanism for the stage apparatus according to claim 1, wherein base portions of said plurality of lock pins are in the shape of truncated cones, diameters of which increase in a direction away from said ends of said plurality of lock pins, respectively, and
wherein maximum diameters of said base portions are greater than diameters of said plurality of lock holes, respectively.

10. The lock mechanism for the stage apparatus according to claim 1, wherein said stage apparatus comprises two parallel said stationary support boards between which said movable stage is positioned.

11. The lock mechanism for the stage apparatus according to claim 1, wherein said lock mechanism is configured for a camera-shake correction apparatus incorporated in a digital camera.

12. A lock mechanism for a stage apparatus, said stage apparatus having at least one stationary support board and a movable stage, wherein said movable stage is movable relative to said stationary support board in a plane parallel to said stationary support board, said lock mechanism comprising:
at least one lock hole made in one of said stationary support board and said movable stage;
at least one lock pin formed on the other of said stationary support board and said movable stage to be loosely engaged in said lock hole to be allowed to move relative to said lock hole; and
a driving device positioned beside said movable stage on a periphery thereof and lying in a plane in which said movable stage lies,
wherein said driving device moves away from said movable stage upon said movable stage entering an operational state, and wherein said driving device presses said movable stage in a direction of movement thereof to make said lock pin pressure contact an inner edge in said lock hole upon said movable stage entering a non-operational state.

13. The lock mechanism for the stage apparatus, according to claim 12, wherein said lock mechanism comprises a plurality of said lock holes, and a corresponding plurality of said lock pins.

14. The lock mechanism for the stage apparatus, according to claim 12, wherein said lock hole and said lock pin constitute a moving range limiting device which limits the range of movement of said movable stage.

15. The lock mechanism for the stage apparatus according to claim 12, wherein said driving device comprises a motor having an output shaft, an axis of which is parallel to said movable stage, said output shaft being movable toward and away from said movable stage in a direction of said axis of said output shaft.

16. The lock mechanism for the stage apparatus according to claim 12, wherein said stage apparatus comprises two said stationary support boards positioned on opposite sides of said movable stage,
wherein said lock pin comprises a column which connects said two stationary support boards, and
wherein said lock hole is formed in said movable stage.

17. The lock mechanism for the stage apparatus according to claim 12, wherein said lock hole is rectangular in shape.

18. A lock mechanism for a stage apparatus, said stage apparatus having at least one stationary support board and a movable stage, wherein said movable stage is movable relative to said stationary support board in a plane parallel to said stationary support board, said lock mechanism comprising:
a plurality of lock holes made in one of said stationary support board and said movable stage;
a plurality of lock pins formed on the other of said stationary support board and said movable stage to be engageable in said lock holes, respectively, to be allowed to move relative to said lock holes; and
a driving device provided at a periphery of said movable stage and positioned in a plane in which said movable stage lies and moves,
wherein said driving device moves said lock pins so as to contact said lock holes, respectively, upon said movable stage entering a non-operational state, and moves said lock pins so as to not to contact said lock holes, respectively, upon said movable stage entering an operational state.

* * * * *